(12) United States Patent
Tokutake

(10) Patent No.: US 9,639,261 B2
(45) Date of Patent: May 2, 2017

(54) APPARATUS AND METHOD FOR CONTROLLING A SUSPENDED STATE

(71) Applicant: Sony Corporation, Minato-ku (JP)

(72) Inventor: Kenji Tokutake, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 225 days.

(21) Appl. No.: 14/097,031

(22) Filed: Dec. 4, 2013

(65) Prior Publication Data

US 2015/0153803 A1    Jun. 4, 2015

(51) Int. Cl.
*G06F 1/32* (2006.01)
*G06F 3/0488* (2013.01)

(52) U.S. Cl.
CPC .......... *G06F 3/0488* (2013.01); *G06F 1/3206* (2013.01); *G06F 1/3262* (2013.01); *G06F 1/3265* (2013.01); *G06F 1/3203* (2013.01); *Y02B 60/1242* (2013.01)

(58) Field of Classification Search
CPC ....................................................... G06F 1/32
USPC ....................................................... 713/323
See application file for complete search history.

(56) References Cited

U.S. PATENT DOCUMENTS

| | | | |
|---|---|---|---|
| 5,844,482 A * | 12/1998 | Guthrie | G08B 13/1436 340/568.1 |
| 6,594,615 B2 * | 7/2003 | Bernard | H03K 17/945 702/150 |
| 2007/0085157 A1 * | 4/2007 | Fadell | G06F 3/0304 257/428 |
| 2009/0181719 A1 * | 7/2009 | Cho | H04M 1/72522 455/556.1 |
| 2011/0010572 A1 * | 1/2011 | Chen | G06F 1/3203 713/323 |
| 2011/0105096 A1 * | 5/2011 | Dods | H04W 52/0251 455/418 |

(Continued)

FOREIGN PATENT DOCUMENTS

JP    2004-201220    7/2004

OTHER PUBLICATIONS

U.S. Appl. No. 14/024,328, filed Sep. 11, 2013, Ino, et al.

*Primary Examiner* — Thomas Lee
*Assistant Examiner* — Volvick Derose
(74) *Attorney, Agent, or Firm* — Oblon, McClelland, Maier & Neustadt, L.L.P.

(57) ABSTRACT

A device includes a proximity sensor configured to detect when an object is within a predetermined proximity range of the device, and input detection circuitry configured to detect when an input operation is performed on the device. The terminal device includes control circuitry configured to determine a proximity detection state of the device, wherein an object detection state corresponds to a proximity state in which the object is detected within the predetermined proximity range, and an object non-detection state corresponds to a proximity state in which the object is not detected within the predetermined proximity range; control a suspended state of the device, wherein the suspended state is a state of reduced processing and/or power consumption; and control the input detection circuitry such that, when the device is in the suspended state and in the object detection state, the input detection circuitry stops input operation detection processing.

19 Claims, 23 Drawing Sheets

(56) References Cited

U.S. PATENT DOCUMENTS

| | | | |
|---|---|---|---|
| 2011/0164063 A1* | 7/2011 | Shimotani | G06F 3/0416 345/661 |
| 2011/0300881 A1* | 12/2011 | Sim | H04M 1/26 455/456.3 |
| 2011/0316679 A1* | 12/2011 | Pihlaja | G06F 3/04815 340/407.2 |
| 2012/0105193 A1* | 5/2012 | Gritti | G08B 13/00 340/3.4 |
| 2012/0139877 A1* | 6/2012 | Kawabe | G06F 1/1643 345/175 |
| 2012/0154292 A1* | 6/2012 | Zhao | G06F 1/1626 345/173 |
| 2012/0270611 A1* | 10/2012 | Choi | G06F 1/3206 455/574 |
| 2012/0319972 A1* | 12/2012 | Tse | G06F 1/3262 345/173 |
| 2013/0076688 A1 | 3/2013 | Tokutake | |
| 2013/0090151 A1* | 4/2013 | Ngai | H04W 52/0241 455/574 |
| 2013/0106774 A1* | 5/2013 | Radivojevic | G06F 3/044 345/174 |
| 2013/0120311 A1* | 5/2013 | Ichikawa | G09G 3/20 345/174 |
| 2013/0215007 A1* | 8/2013 | Hung | G06F 1/1677 345/156 |
| 2013/0265248 A1* | 10/2013 | Nagahara | G06F 3/041 345/173 |
| 2014/0176477 A1* | 6/2014 | Nakao | G06F 3/0416 345/173 |
| 2014/0204045 A1* | 7/2014 | Komoto | G06F 3/044 345/173 |
| 2014/0218337 A1* | 8/2014 | Yamaguchi | G06F 3/044 345/174 |
| 2014/0232540 A1* | 8/2014 | S | H04W 52/0251 340/539.11 |
| 2014/0254784 A1* | 9/2014 | Kim | H04M 3/42229 379/207.02 |
| 2014/0267133 A1* | 9/2014 | Steuer | G01R 27/2605 345/174 |
| 2014/0351560 A1* | 11/2014 | Lautner | G06F 3/0346 712/30 |
| 2014/0351618 A1* | 11/2014 | Connell | G06F 1/3265 713/323 |
| 2014/0372109 A1* | 12/2014 | Iyer | H03G 3/3089 704/225 |

* cited by examiner

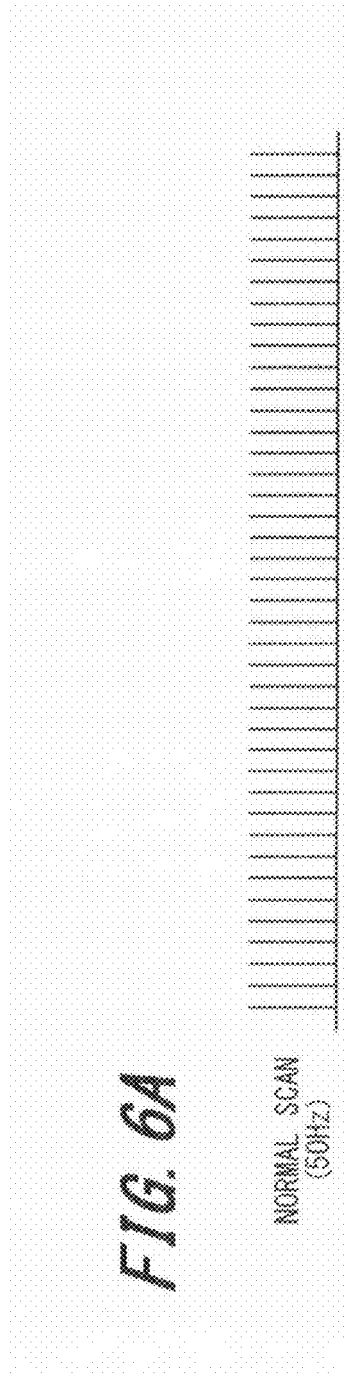
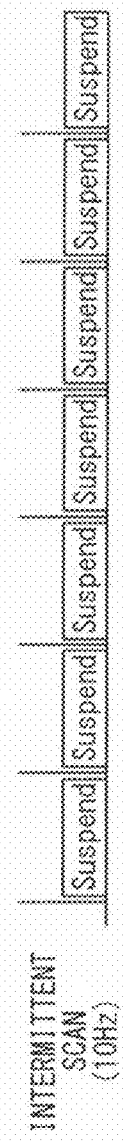
FIG. 6A NORMAL SCAN (50Hz)
FIG. 6B INTERMITTENT SCAN (10Hz)

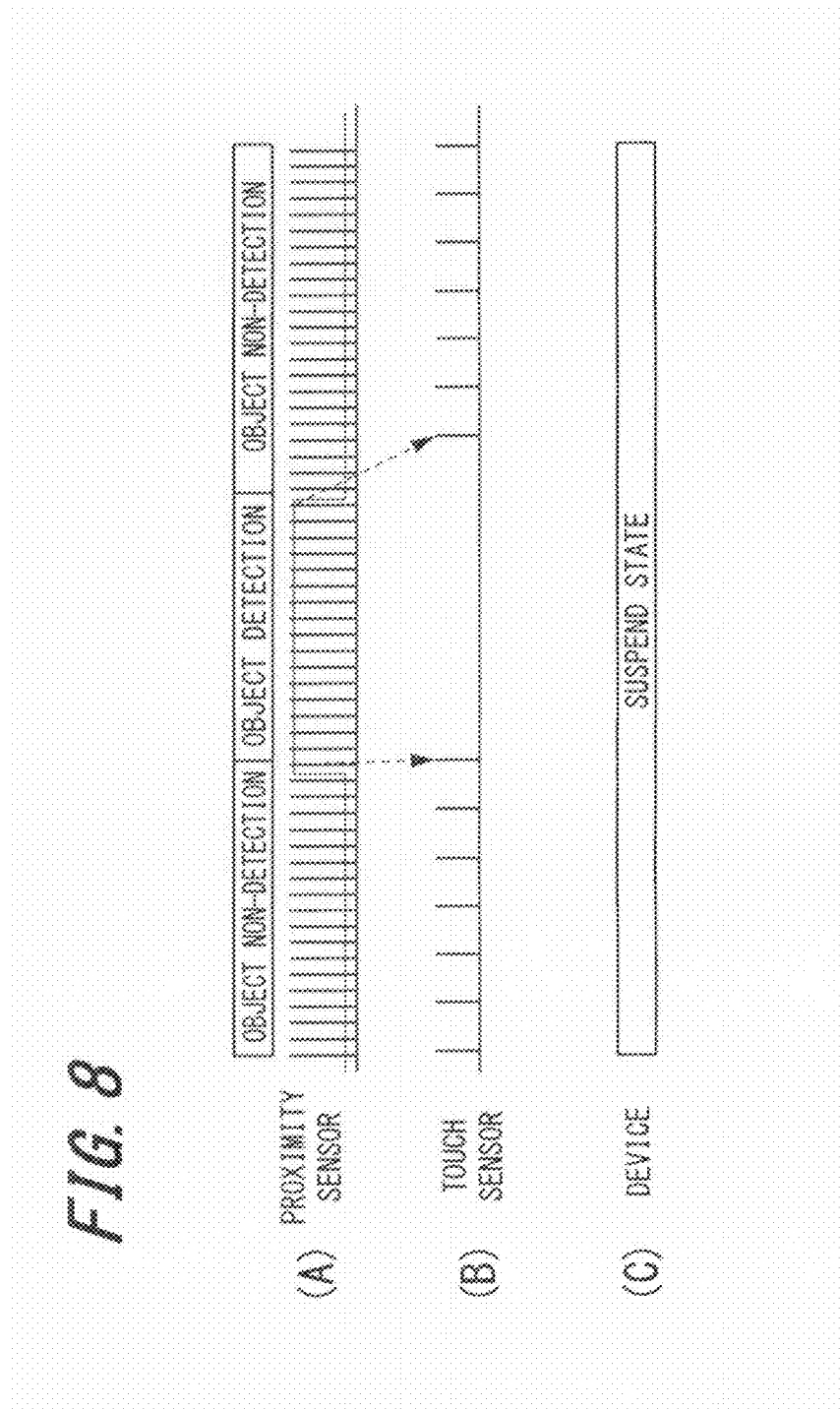

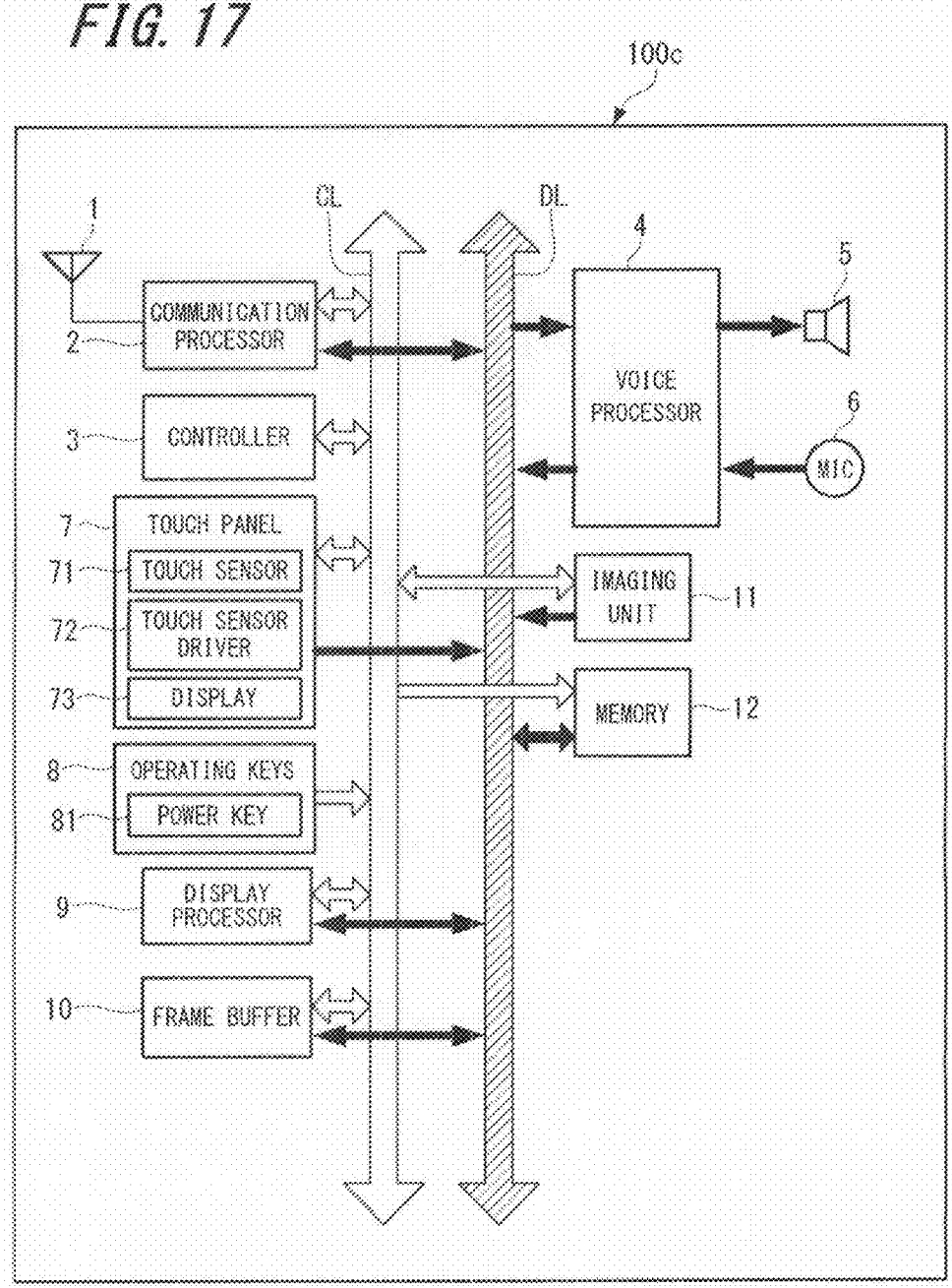

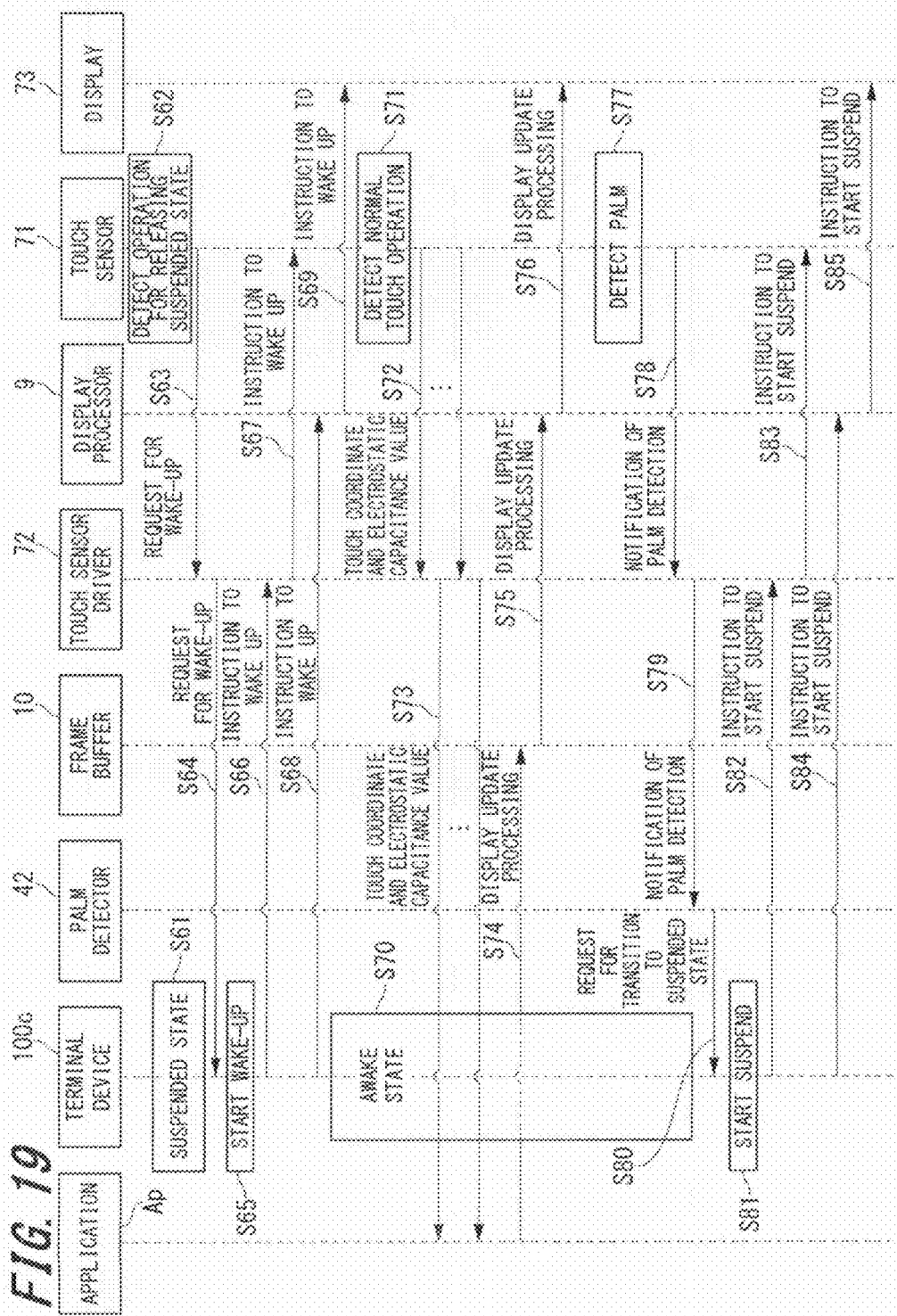

FIG. 20A
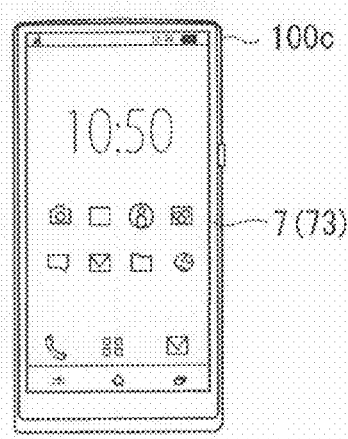
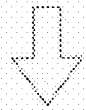
FIG. 20B
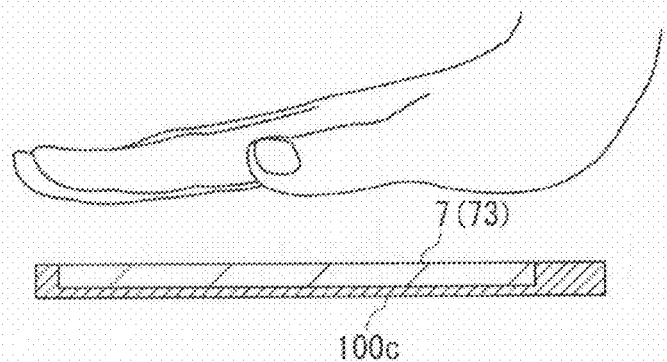
FIG. 20C
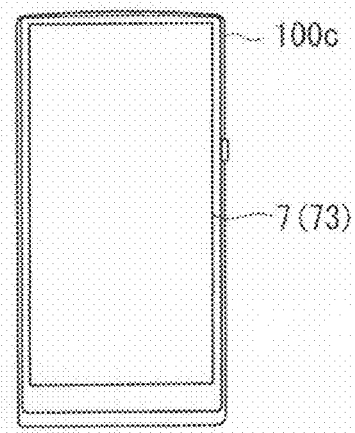

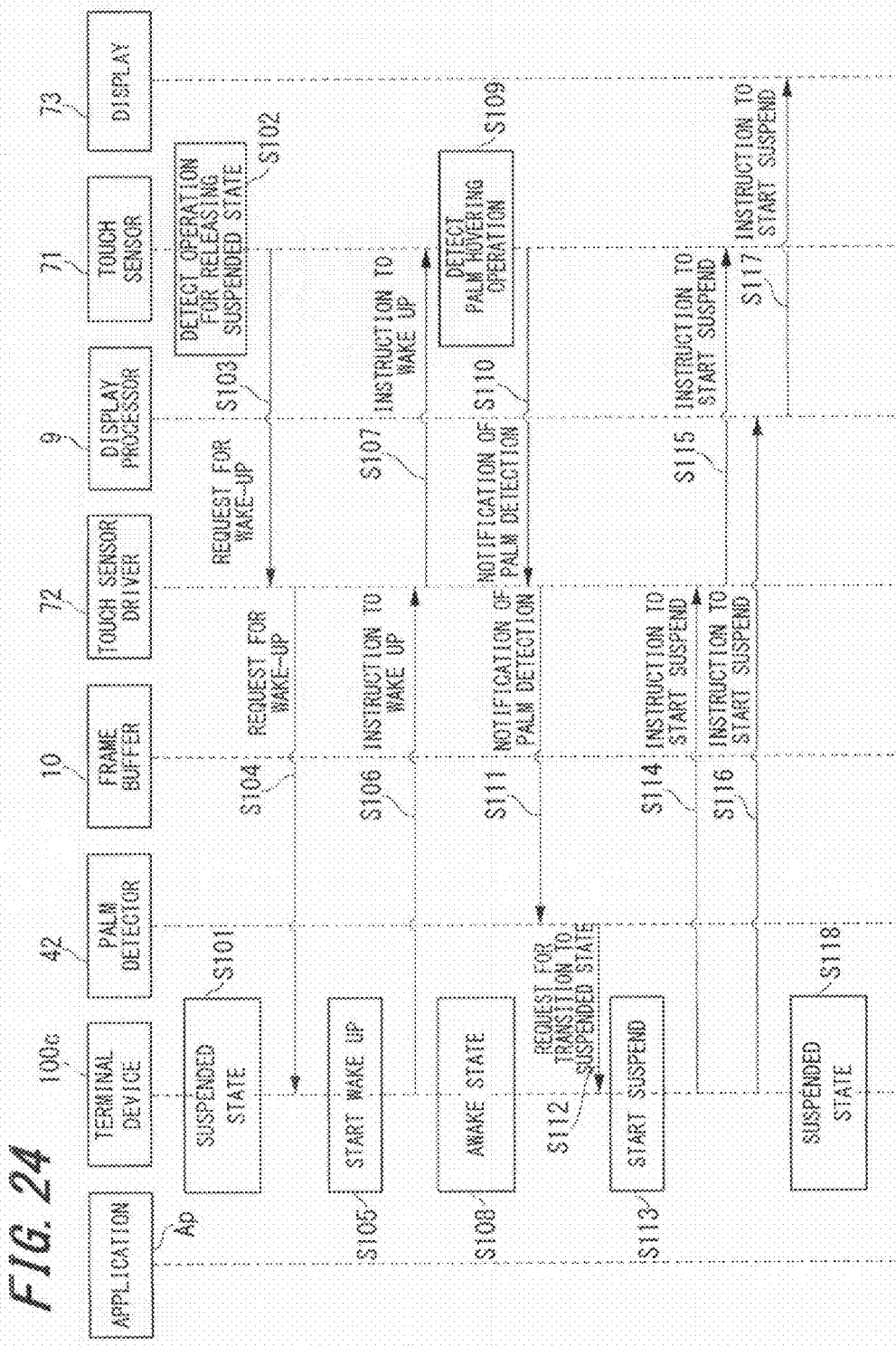

APPARATUS AND METHOD FOR CONTROLLING A SUSPENDED STATE

BACKGROUND

Technical Field

The present disclosure relates to controlling a suspended state of a terminal device, such as a mobile phone, a smart phone, a tablet device, or the like.

Description of Related Art

Terminal devices may include a processor configured to place the terminal device in a suspended state to preclude unnecessary consumption of power resources while the device is not in use. Some terminal devices may include external buttons, and a signal may be generated to release the terminal device from the suspended state when an external button operation is detected (e.g., pressing a power key). Other terminal device processors may be configured to release the device from the suspended state based on inputs other than physical button operations. For example, a touch operation performed on a surface of a touch panel display included in the terminal device may be detected and in response, a signal may be generated to release the device from the suspended state. Similarly, an audio input may be detected to release a terminal device from the suspended state.

SUMMARY

In cases where the suspended state may be released in response to detecting an input operation other than a physical button manipulation, a situation arises where the device may be released from the suspended state inadvertently, without the knowledge of the user. For example, a touch operation may be detected when the terminal device is stored in a user's pocket, which may result in the suspended state being released when such an action is not desired. Therefore, in these circumstances, the benefit of the suspended state is lost due to the unnecessary power consumption and unintended processing that results from an inadvertent release of the suspended state.

In certain embodiments, a terminal device includes a proximity sensor configured to detect when an object is within a predetermined proximity range of the device. The terminal device may include input detection circuitry configured to detect when an input operation is performed on the device. The terminal device may include control circuitry configured to determine a proximity detection state of the device, wherein an object detection state corresponds to a proximity state in which the proximity sensor detects the object within the predetermined proximity range, and an object non-detection state corresponds to a proximity state in which the object is not detected within the predetermined proximity range. The control circuitry may control a suspended state of the device, wherein the suspended state is a state of reduced processing and/or power consumption relative to a normal operating state. The control circuitry may control the input detection circuitry such that, when the device is in the suspended state and in the object detection state, the input detection circuitry stops processing related to the detection of the input operation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 6A and 6B illustrate non-limiting examples of proximity sensor scan rates, according to certain embodiments;

Next, FIGS. 8A through 8C illustrate a non-limiting example of proximity sensor and touch sensor scanning operations according to the exemplary flowcharts illustrated in FIGS. 4 and 5;

FIG. 17 illustrates a non-limiting example of a block diagram of a terminal device for controlling a suspended state based on features of a touch sensor output distribution area, according to certain embodiments;

FIG. 19 illustrates a non-limiting example of a sequence diagram for performing processing to control a suspended state of a terminal device based on features of a touch sensor output distribution area, according to certain embodiments;

FIGS. 20A through 20C illustrate exemplary features of controlling a suspended state of a terminal device based on a detected hovering operation, according to certain embodiments;

FIG. 24 illustrates a non-limiting example of a sequence diagram for performing processing related to the control of a suspended state based on detected features of a touch sensor output distribution area, according to certain embodiments

DETAILED DESCRIPTION

Figure 1:
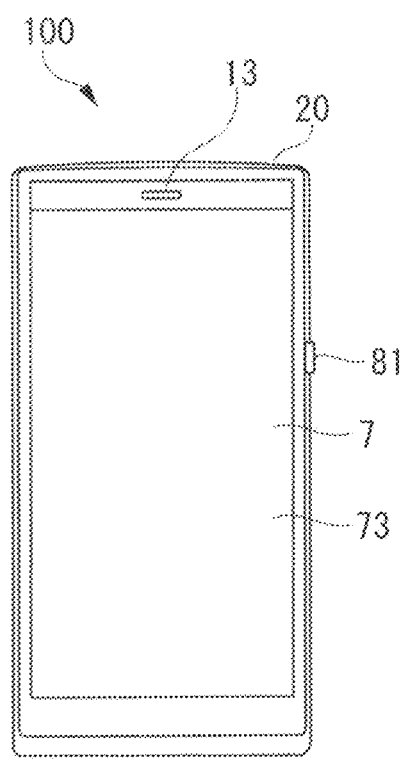
FIG. 1 illustrates a non-limiting example of a terminal device external structure, according to certain embodiments.

Referring now to the drawings, wherein like reference numerals designate identical or corresponding parts throughout the several views.

Referring first to FIG. 1, FIG. 1 illustrates a non-limiting example of a terminal device external structure, according to certain embodiments. Terminal device 100 illustrated in FIG. 1 includes a protective case 20 surrounding a display 73. The display 73 is included on a frontal surface of the terminal device 100 and, in certain embodiments, may be formed integrally with a touch panel 7. The touch panel 7 may, in certain embodiments, including one or more touch sensors for detecting a touch operation on an operating surface of the display 73. Aspects of detecting a touch operation on the display 73 will be discussed later in greater detail.

The exemplary terminal device 100 of FIG. 1 includes a power key 81 disposed along an edge of the terminal device 100. In certain embodiments, in addition to providing a mechanism for cycling power to the terminal device 100, the power key 81 may be configured such that the terminal device 100 enters a suspended state in response to detecting an operation of the power key 81.

The exemplary terminal device 100 of FIG. 1 also includes a proximity sensor 13. In certain embodiments, the proximity sensor 13 may be configured to detect when an object is within a predetermined proximity (i.e., distance, range, etc.) from the terminal device 100. For example, the proximity sensor 13 may detect when the terminal device 100 is placed in a user's pocket by detecting the user's clothing within a predetermined detection range of the proximity sensor 13. Aspects of detecting the presence of an object with respect to the terminal device 100 via the proximity sensor 13 will be discussed in greater detail in later paragraphs.

Figure 2:
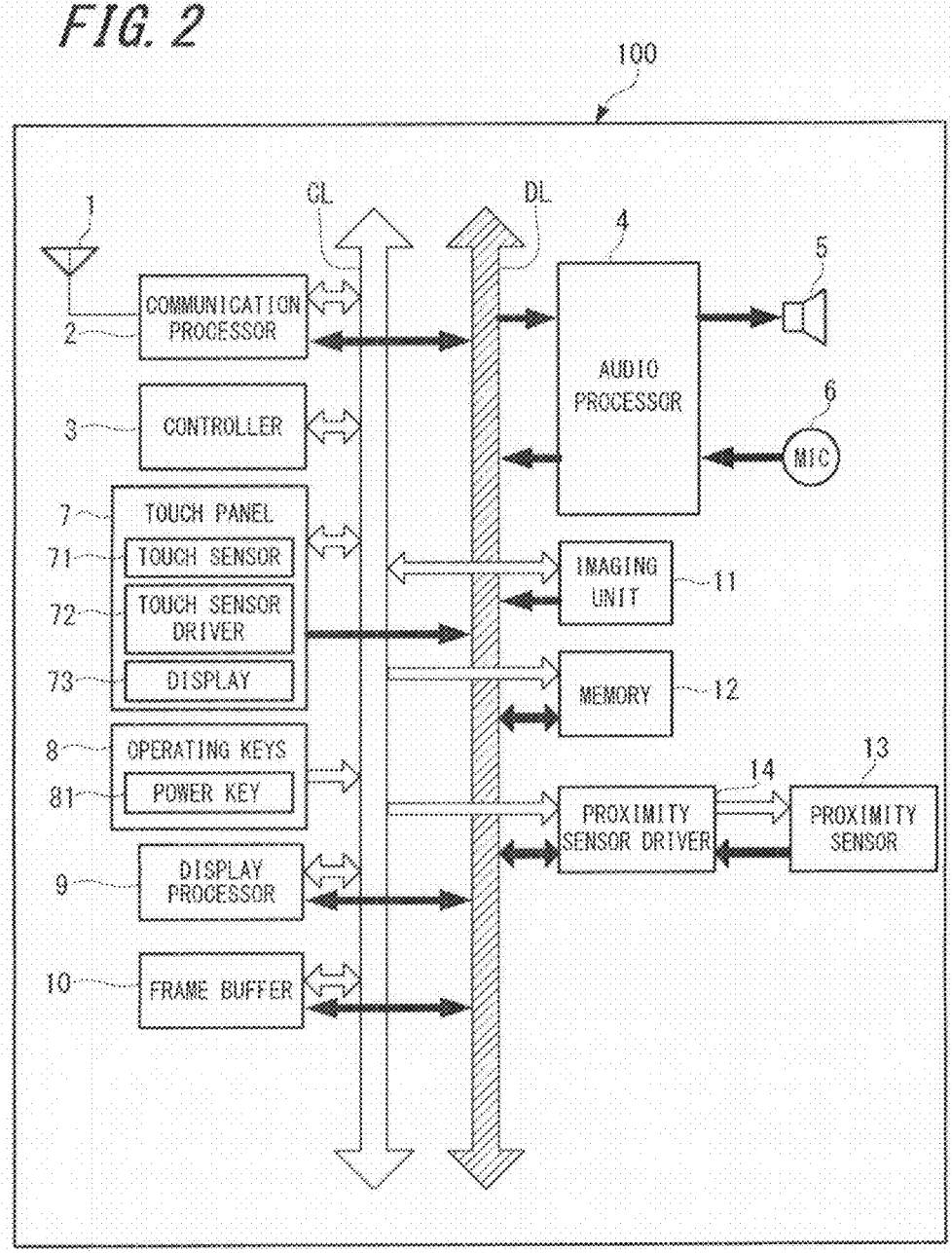
FIG. 2 illustrates a non-limiting example of a block diagram for a terminal device, according to certain embodiments.

Next, FIG. 2 illustrates a non-limiting example of a block diagram for a terminal device, according to certain embodiments.

Referring now to FIG. 2, terminal device 100 includes a communication processor 2 connected to an antenna 1, a controller 3, an audio processor 4, a speaker 5, and a microphone 6.

The antenna 1 transmits/receives electromagnetic wave signals between base stations for performing radio-based communication, such as the various forms of cellular telephone communication.

The communication processor 2 controls the communication performed between the terminal device 100 and other external devices via the antenna 1. For example, the communication processor 2 may control communication between base stations for cellular phone communication.

The controller 3 may include one or more Central Processing Units (CPUs), and may control each element in the terminal device 100 to perform features related to communication control, audio signal processing, control for the audio signal processing, still and moving image processing and control, and other kinds signal processing. The controller 3 may perform these features by executing instructions stored in a memory 12. Alternatively or in addition to the local storage of the memory 12, the features may be executed using instructions stored on an external device accessed on a network, or on a non-transitory computer readable medium. The memory 12 may include, e.g., Read Only Memory (ROM), Random Access Memory (RAM), or a memory array including a combination of volatile and non-volatile memory units. The memory 12 may be utilized as working memory by the controller 3 while executing the processing and algorithms of the present disclosure. Additionally, the memory 12 may be used for long-term storage, e.g., of image data and information related thereto.

The controller 3, in certain embodiments, may control a suspended state of the terminal device 100. The suspended state may, e.g., correspond to a low power consumption state. The controller 3 may, in certain embodiments, control the terminal device 100 to awaken from the suspended state (i.e., an "awake state") or cause the terminal device 100 to enter the suspended state based on a detected input, e.g., from a key included in operating keys 8 (e.g., power button 81) and/or a touch operation on touch panel 7. The controller 3 may, in certain embodiments, cause the terminal device 100 to enter the suspended state when a predetermined time interval elapses without a detected input to the terminal device 100 (i.e., a "non-operation state"). In certain embodiments, the controller 3 controls the operation of the suspended state by managing processing performed in accordance with an operating system (OS), which may be include instructions stored in the memory 12 and which may interface with the elements of the terminal device 100 to control the elements' functionality in the suspended and awake states.

In certain embodiments, the controller 3 may control scanning operations performed by a proximity sensor 13 and a touch sensor 71. For example, the controller 3 may control a scan rate (e.g., normal scan rate or intermittent scan rate) of the proximity sensor 13 and the touch sensor 71, and the controller 3 may cause the proximity sensor 13 and/or the touch sensor 71 to initiate or cease scanning their respective scanning operations based, e.g., on whether the terminal device 100 is in the suspended or awake state. In certain embodiments, the controller 3 may control the scanning processing of the touch sensor 71 such that the touch sensor 71 continues scanning for a touch operation when the terminal device 100 is in the suspended state, in which case the controller 3 may execute processing for releasing the terminal device 100 from the suspended state when a touch operation is detected. However, this exemplary control processing with respect to the touch sensor 71 is not limiting.

In certain embodiments, the controller 3 may control elements of the terminal device 100 such that "quick starting" of applications and associated interfaces is performed. The quick starting may, e.g., cause an application to initiate processing simultaneously with the processing for releasing the terminal device 100 from the suspended state. For example, the controller 3 may, in conjunction with processing for releasing the terminal device 100 from the suspended state, initiate processing of an imaging unit 11 and/or initiate an imaging/camera application associated with the imaging unit 11. Settings for processing related to quick starting may be stored in the memory 12.

The terminal device 100 includes a control line CL and data line DL as internal communication bus lines. Control data to/from the controller 3 may be transmitted through the control line CL. The data line DL may be used for transmission of voice data, display data, etc.

The audio processor 4 demodulates and/or decodes the audio data read from the memory 12, or audio data received by the communication processor 2. Additionally, the audio processor 4 may decode audio signals obtained by the microphone 6.

The speaker 5 emits an audio signal corresponding to audio data supplied from the audio processor 4. In certain embodiments, an audio input terminal may be included in the terminal device 100 such that audio output from the audio processor 4 may be emitted via the audio input terminal and an audio jack connected to the speaker 5. A non-limiting example of an audio jack is a 2.5 mm stereo phone connector, e.g., on personal headphones.

The microphone 6 detects surrounding audio, and converts the detected audio into an audio signal. The audio signal may then be output to the audio processor 4 for further processing. In certain embodiments, the microphone 6 may be formed integrally with the speaker 5 such that when the audio jack is inserted in the audio input terminal, the input/output of audio signals may be performed on a common device (e.g., a headset device). It should be appreciated that the present disclosure is not limited to audio input/output devices such as the speaker 5 and the microphone 6 having physical, wired connections. Rather, in certain embodiments, the terminal device 100 may be configured to communicate wirelessly with external devices, e.g., via a wireless protocol such as Bluetooth, Near Field Communication (NFC), Wi-Fi, 802.11, etc., and the establishment of such a wireless connection may be detected by the controller 3 when performing processing related to the control of the suspended state.

The exemplary terminal device 100 of FIG. 2 may also include display 73, a touch panel 7, and operating keys 8.

The display 73 may be a Liquid Crystal Display (LCD), an organic electroluminescence display panel, or another display screen technology. In addition to displaying still and moving image data, the display 73 may display operational inputs, such as numbers or icons, which may be used for control of the terminal device 100. The display 73 may additionally display a graphical user interface such that a user may control aspects of the terminal device 100 and/or other devices. In certain embodiments, the controller 3 may control the display 73 to display a home screen interface, the most recent interface, or another interface when the suspended state of the terminal device 100 is released. Further, the display 73 may display characters and images received by the terminal device 100 and/or stored in the memory 12 or accessed from an external device on a network. For example, the terminal device 100 may access a network such as the Internet, and display text and/or images transmitted from a Web server.

A frame buffer 10 may be included in the terminal device 100 for providing temporary memory storage for the display 73. For example, a display processor 9 may perform processing for outputting video data or an interface on the display 73. Data related to the display processing may be saved in the frame buffer 10, and the data may be read by the display processor 9 when performing display control processing.

The touch panel 7 may include a physical touch panel display screen (display 73) with touch sensor 71 and a touch sensor driver 72. The touch sensor 71 may include one or more touch sensors for detecting an input operation on an operation surface of touch panel 7 display screen. The touch sensors of the touch sensor 72 may, in certain embodiments, be formed on a printed circuit board or a transparent film. Used herein, the phrase "touch operation" refers to an input operation performed by touching an operation surface of the touch panel display with an instruction object, such as a finger or stylus-type instrument. In the case where a stylus, or the like, is used in a touch operation, the stylus may include a conductive material at least at the tip of the stylus such that the sensors included in the touch sensor 7 may detect when the stylus approaches/contacts the operation surface of the touch panel display (similar to the case in which a finger is used for the touch operation).

In certain aspects of the present disclosure, the touch panel 7 may be disposed adjacent to the display 73 (e.g., laminated), or may be formed integrally with the display 73. For simplicity, the present disclosure assumes the touch panel 7 is formed integrally with the display 73 and therefore, examples discussed herein may describe touch operations being performed on the surface of the display 73 rather than the touch panel 7. However, the skilled artisan will appreciate that this is not limiting.

For simplicity, the present disclosure assumes the touch panel 7 is an electrostatic capacitance-type touch panel technology; however, it should be appreciated that aspects of the present disclosure may easily be applied to other touch panel types (e.g., resistance type touch panels) with alternate structures. In the case of an electrostatic-capacitance touch panel display, when conductors, such as a finger or stylus, approach or contact the touch panel 7, the electrodes of the touch sensor 71 may detect and measure electrostatic capacitance changes, and features of the touch operation may be determined based on the detections/measurements. In certain aspects of the present disclosure, the touch panel 7 may include transparent electrode touch sensors arranged in the X-Y direction on the surface of transparent sensor glass.

The touch sensor driver 72 may be included in the touch panel 7 for control processing related to the touch panel 7, such as scanning control. For example, the touch sensor driver 72 may scan each sensor in an electrostatic capacitance transparent electrode pattern in the X-direction and Y-direction and detect the electrostatic capacitance value of each sensor to determine when a touch operation is performed. The touch sensor driver 72 may output a coordinate and a corresponding electrostatic capacitance value for each sensor.

In certain embodiments, the controller 3 may control a scan rate of the touch sensor 71 via the touch sensor driver 72. For example, when the terminal device 100 is in the awake state, the touch sensor driver 72 may set the scan rate of the touch sensor 71 to 50 Hz, which corresponds to a "normal" scan rate. As another example, when the terminal device 100 is in the suspended state, the touch sensor driver 72 may set the scan rate of the touch sensor 71 to 10 Hz, which corresponds to an "intermittent" scan rate. Additionally, the touch sensor driver 72 may initiate and cease scanning operations by the touch sensor 71 based on whether the terminal device 100 is in the suspended state. It is noted that the scan rate values given in the above example are not limiting, and the control features described herein may be easily adapted for other scan rates.

The touch sensor driver 72 may also output a sensor identifier that may be mapped to a coordinate on the display 73. Additionally, the touch sensor driver 72 and touch sensor 71 may detect when an instruction object, such as a finger, is within a predetermined distance from an operation surface of the touch panel 7 display screen. That is, the instruction object does not necessarily need to directly contact the operation surface of the touch panel 7 display screen in order for the touch sensor 71 to detect the instruction object and perform processing described herein. For example, in certain embodiments, the touch sensor 71 may detect a user's hand "hovering" over the display 73. In another example, the touch sensor 71 may detect an electrostatic capacitance of a user's body through clothing when the device 100 is stored in the user's pocket. Signals may be transmitted by the touch sensor driver 72, e.g., in response to a detection of a touch operation, in response to a query from another element, based on timed data exchange, etc.

Next, the operating keys 8 may include one or more buttons or similar external control elements, which may generate an operation signal based on a detected input from a user. In addition to outputs from the touch panel 7, these operation signals may be supplied to the controller 3 for performing related processing and control. In certain aspects of the present disclosure, the processing and/or functions associated with external buttons and the like may be performed by the controller 3 in response to an input operation on the touch panel display screen rather than the external button, key, etc. In this way, external buttons on the terminal device 100 may be eliminated in lieu of performing inputs via touch operations, thereby improving water-tightness.

The power key 81 for controlling the power supply for the terminal device 100 may be included in the operating keys 8. In certain embodiments, when the controller 3 detects the power key 81 is pressed while the terminal device 100 is in a suspended state, the controller 3 releases the terminal device 100 from the suspended state and displays, e.g., a home screen interface on the display 73. Otherwise, a lock screen may be displayed until the controller 3 releases the terminal device 100 from the suspended state. In certain embodiments, a detection of pressing the power key 81 while the terminal device 100 is in the awake state may cause the controller 3 to transition the terminal device 100 to the suspended state.

Next, the terminal device 100 may include an imaging unit 11, proximity sensor 13, and proximity sensor driver 14.

The imaging unit 11 may be configured to capture still and moving image data. In certain embodiments, the imaging unit 11 may by a charge-coupled device (CCD), Complementary Metal Oxide Semiconductor (CMOS) device, or the like. In certain embodiments, image data generated by the imaging unit 11 may be applied as an input for determining a proximity detection state of the terminal device 100. For example, when image data generated by the imaging unit 11 indicates, based on an analysis of image features, that the terminal device 100 is stored in a storage container (e.g., a user's pocket), then the controller 3 may determine that the terminal device is in the object detection state. Exemplary image features that may be analyzed when determining the proximity state include image brightness, color, and color gradient changes across the image. For example, an image captured by the imaging unit 11 when the terminal device 100 is in a user's pocket may be substantially black with little change in color within the image (similar to the case when the lens cap is on a conventional camera), which may indicate the terminal device 100 is stored in the pocket.

The proximity sensor 13 may include one or more sensors for detecting an object within a predetermined proximity of the terminal device 100 (i.e., determining whether an "object detection" or "object non-detection" state exists). In certain embodiments, the one or more sensors may measure reflected light using infrared rays as a process for determining whether an object is within the predetermined proximity of the terminal device 100. The proximity sensor driver 14 controls the proximity sensor 13, and may perform a determination as to whether an object is within the predetermined proximity of the terminal device 100 based on sensor data related to, e.g., the amount of reflected light detected by the proximity sensor 13. The proximity sensor driver 14 may also control a scan rate of the proximity sensor 13. As a non-limiting example, the proximity sensor driver 14 may set the proximity sensor 13 scan rate to 50 Hz when the terminal device 100 is in the awake state, and the scan rate may be set to 10 Hz when the terminal device 100 is in the suspended state. As mentioned previously, the specific scan rate values discussed herein are not limiting. Further, the present disclosure is not limited to performing object proximity detection based on reflected light. Rather, the present disclosure may be easily adapted for proximity detection methods using, e.g., induction, capacitance, ultrasonic, and electromagnetic waveform technologies.

Figure 3:
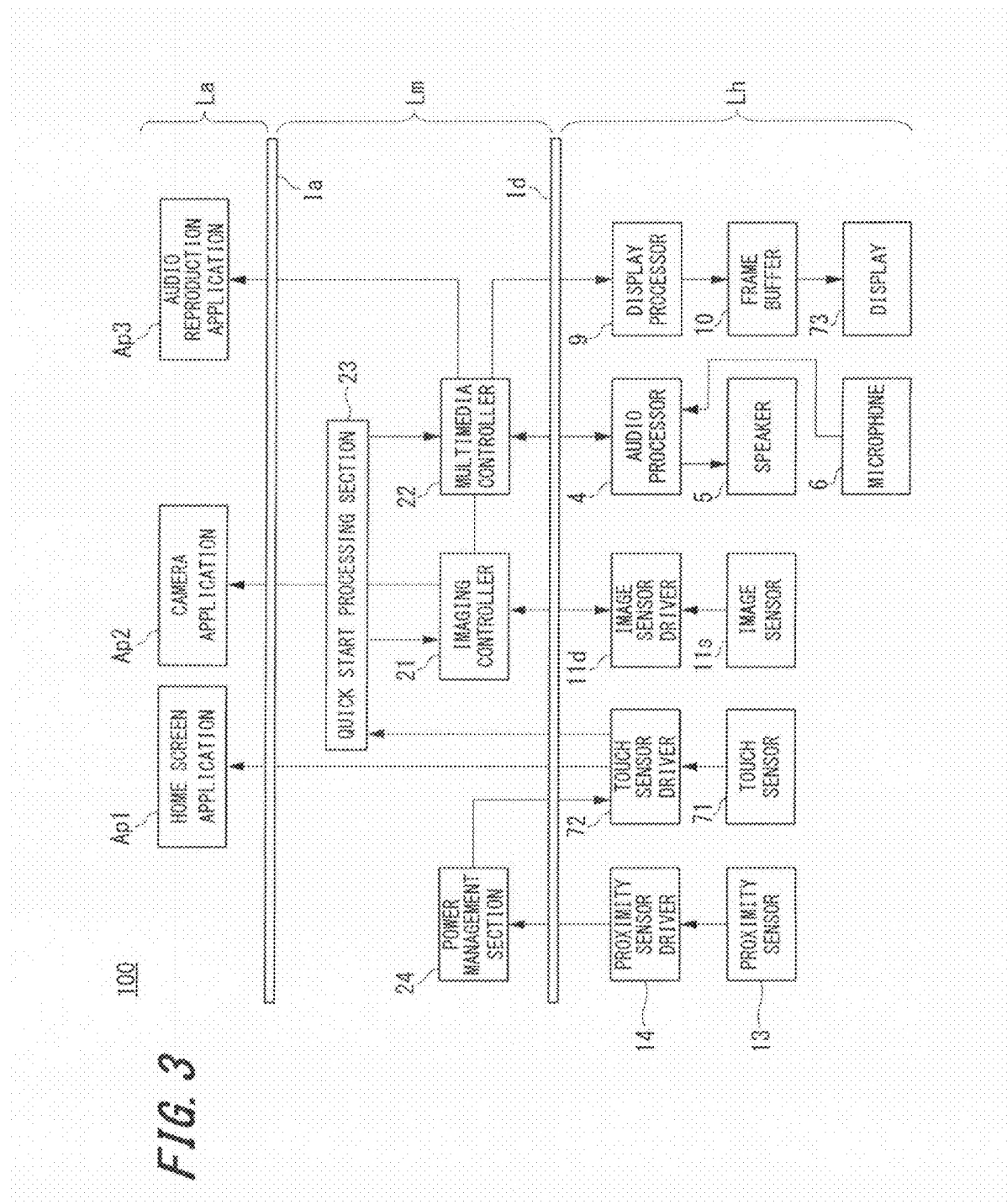
FIG. 3 illustrates a non-limiting example of a layer structure of software and hardware operating on a terminal device, according to certain embodiments.

Next, FIG. 3 illustrates a non-limiting example of a layer structure of software and hardware operating on a terminal device, according to certain embodiments.

The exemplary layer structure illustrated in FIG. 3 includes a hardware layer Lh, a middleware layer Lm, and an application layer La. Each of the layers illustrated in the example of FIG. 3 include various modules, and the operational relationships between the modules within and across layers is illustrated in the figure. Modules previously discussed above for FIG. 2 are illustrated in FIG. 3 within the hardware layer Lh. Specifically, the hardware layer Lh of FIG. 3 includes the voice processor 4, the speaker 5, the microphone 6, the display processor 9, the frame buffer 10, the display 73, the proximity sensor 13 and proximity sensor driver 14, and the touch sensor 71 and touch sensor driver 72. Additionally, the hardware layer Lh, in certain embodiments, may include an image sensor 11s and an image sensor driver 11d. In certain embodiments, the image sensor 11s and the image sensor driver 11d may be included in the imaging unit 11. The image sensor 11s may include one or more sensors configured to capture still or moving image data and the image sensor driver 11d may be configured to control the image sensor 11s and to interface with an imaging controller 21 in the middleware layer Lm.

Delivery of data between the application layer La and the middleware layer Lm may be performed via an application programming interface (API) Ia, which may mediate various processing features described herein. Similarly, delivery of data between the middleware layer Lm and the hardware layer HM may be performed by an API driver Id.

In certain embodiments, the application layer La includes a home screen application Ap1, a camera application Ap2, and a voice reproduction application Ap3. In certain embodiments, the controller 3 may control processing executed within the application layer La by controlling the various modules illustrated in the middleware layer Lm, as well as the hardware elements illustrated in the hardware layer Lh.

The home screen application Ap1 is an application which displays a home screen interface on the display 73 based on information supplied from the touch sensor driver 72. The camera application Ap2 is an application that displays still image or moving image data based on an input from imaging controller 21 via the image sensor 11s and image sensor driver 11d. Audio reproduction application Ap3 is an application in which audio signals may be output via the speaker 5 based on inputs received from multimedia controller 22 via the audio processor 4 and the microphone 6.

Referring now to the middleware layer Lm, in certain embodiments, the middleware layer Lm may include the imaging controller 21, the multimedia controller 22, a quick start processing section 23, and a power management section 24. As mentioned previously, in certain embodiments, processing features discussed herein with respect to the middleware layer Lm (and application layer La) may be executed by processing circuitry included in the controller 3. The imaging controller 21 supplies imaging data based on images captured by the image sensor 11s. The imaging data may be output by the imaging controller 21 to the camera application Ap2 and/or the multimedia controller 22. In certain embodiments, the imaging controller 21 may perform a power activation process and/or an initialization process with respect to the image sensor driver 11d based on an input received from the quick start processing section 23. For example, when releasing the terminal device 100 from a suspended state, the imaging controller 21 may receive a wakeup instruction from the quick start processing section 23 and in response to receiving the instruction, the imaging controller 21 may perform the power activation and/or initialization processing to awaken the image sensor driver 11d.

The multimedia controller 22 may perform processing related to outputting image data supplied from the imaging controller 21. The imaging data supplied from the imaging controller 21 may be output to the frame buffer 10 via the display processor 9. Additionally, the multimedia controller 22 may perform processing related to the input and output of audio data with respect to the audio processor 4 and/or the audio reproduction application Ap3.

In certain embodiments, the quick start processing section 23 may perform processing to release processing elements of the terminal device 100 from a suspended state. Further, the quick start processing section 23 may perform processing to resume the middleware functions that are relevant to a "quick start" process. For example, the camera application Ap2 may be configured to simultaneously resume functionality together with processing related to the release of the suspended state of the terminal device 100. In this example, the quick start processing section 23 may output a quick start signal to the imaging controller 21 and/or the camera application Ap2 such that a quick start may be performed simultaneously with the release of the suspended state. In certain embodiments, the quick start processing section 23 may output a quick start signal in response to a signal received from the touch sensor driver 72 via the touch sensor 71. For example, a touch operation may be detected on the touch panel 7 via the touch sensor 71, and a detection signal may be output by the touch sensor driver 72 to the quick start processing section 23. In response to receiving the detection signal, the quick start processing section 23 may output a quick start signal to one or more modules within the middleware layer Lm, or cross other layers illustrated in FIG. 3, such that a quick start of relevant applications may be performed.

The power management section 24, in certain embodiments, may be configured to perform processing which controls scanning performed by the touch sensor 71. For example, the power management section 24 may control a scanning frequency/rate of the touch sensor 71. As will be discussed in detail in later paragraphs, the power management section 24 may control the touch sensor 71 such that a normal scan rate and an intermittent scan rate are applied. In certain embodiments, the power management section 24 performs its processing features based on inputs received from the proximity sensor driver 14. Further, in certain embodiments, the power management section 24 may control power to the display 73 via the display processor 9. For example, based on an input received from the power management section 24, the display processor 9 may turn off the display 73 when the terminal device 100 is in the suspended state. Further, the control processing features of the power management section 24 related to the touch sensor 71 may be performed in response to the proximity sensor 13 detecting an object within a predetermined distance from the terminal device 100. For example, the power management section 24 may turn off the touch sensor 71 in response to detecting an object with the proximity sensor 13. Further, the power management section 24 may change the scanning rate of the touch sensor 71 from normal to intermittent scan (or vice versa) based on a detection of an object by the proximity sensor 13.

Figure 4:
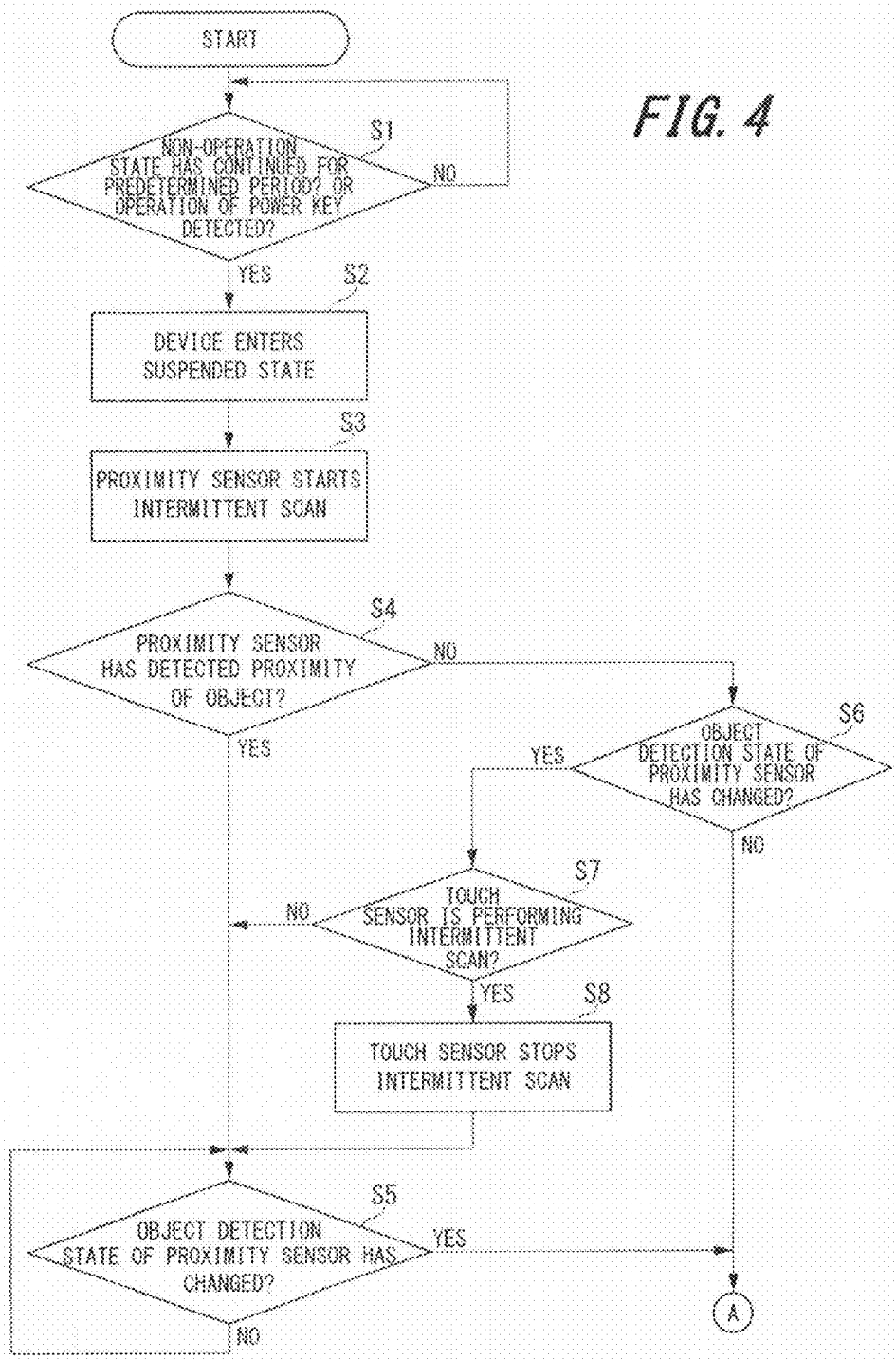
FIG. 4 illustrates a non-limiting exemplary flowchart for controlling aspects of a terminal device suspended state, according to certain embodiments.

Next, FIG. 4 illustrates a non-limiting exemplary flowchart for controlling aspects of a terminal device suspended state, according to certain embodiments.

The processing illustrated in FIG. 4 begins at step S1 where the controller 3 determines whether a non-operation state of the touch panel 7 has continued for a predetermined time period or whether an operation of the power key is detected. The non-operation state of the touch panel 7 may, for example, correspond to a state in which the user has not performed a touch operation within the predetermined time period. If an operation of the touch panel 7 and/or one of the operation keys 8 is determined to have occurred within the predetermined time period, the controller 3 continues performing the verification check at step S1. Otherwise, the controller 3 controls the elements of the terminal device 100 such that the terminal device 100 enters the suspended state at step S2.

At step S3, the controller 3 controls the proximity sensor 13 such that the proximity sensor performs scanning at an intermittent scan rate. A non-limiting example of a scan rate performed at an intermittent frequency is illustrated in FIG. 6A, which will be discussed later.

At step S4, it is determined whether the proximity sensor 13 has detected an object within a predetermined proximity (e.g., within a possible detection range of the proximity sensor 13) of the terminal device 100. A non-limiting example in which the proximity sensor 13 detects an object within the predetermined proximity occurs when the terminal device 100 is stored in the pocket of a user's clothes, in which case the detection of the clothes within the detection range of the proximity sensor 13 may result in a positive determination at step S4. When the proximity sensor 13 detects an object within the predetermined proximity at step S4, the controller 3 at step S5 determines whether the detection state of the proximity sensor 13 has subsequently changed. A non-limiting example in which a detection state of the proximity sensor 13 may change from the detection state previously detected in step S4 includes a case in which the terminal device 100 is removed from the user's pocket. When the controller 3 determines at step S5 that the detection state of the proximity sensor 13 has changed, the processing progresses to the connector A, which will be discussed in greater detail later with respect to FIG. 5.

Referring back to step S4, when it is determined that the proximity sensor 13 has not detected an object within the predetermined proximity of the terminal device 100 at step S4, the processing progresses to step S6. At step S6, the controller 3 determines whether a detection state of the proximity sensor has subsequently changed from the state detected in step S4. That is, the controller 3 at step S6 determines whether the detection state has transitioned from an object non-detection state to an object detection state. A non-limiting example in which a detection state may be detected to have changed at step S6 includes a case in which the user places the terminal device 100 in his or her pocket. In this example, the proximity sensor 13 determined that the terminal device 100 was outside of the user's pocket as step S4, and subsequently determined at step S6 that the terminal device 100 is now stored in the user's pocket, which results in a positive determination at step S6. If the controller 3 at step S6 determines that the detection state has not changed, the processing progresses to connector A, which will be discussed in greater detail with respect to FIG. 5.

Otherwise, the controller 3 at step S7 determines whether the touch sensor 7 is performing scanning at an intermittent scan rate. If it is determined at step S7 that the touch sensor 71 is not performing scanning at the intermittent scan rate, the processing progresses to step S5. Otherwise, the controller 3 at step S8 controls the touch sensor driver 72 to stop the intermittent scan operation of the touch sensor 71.

Figure 5:
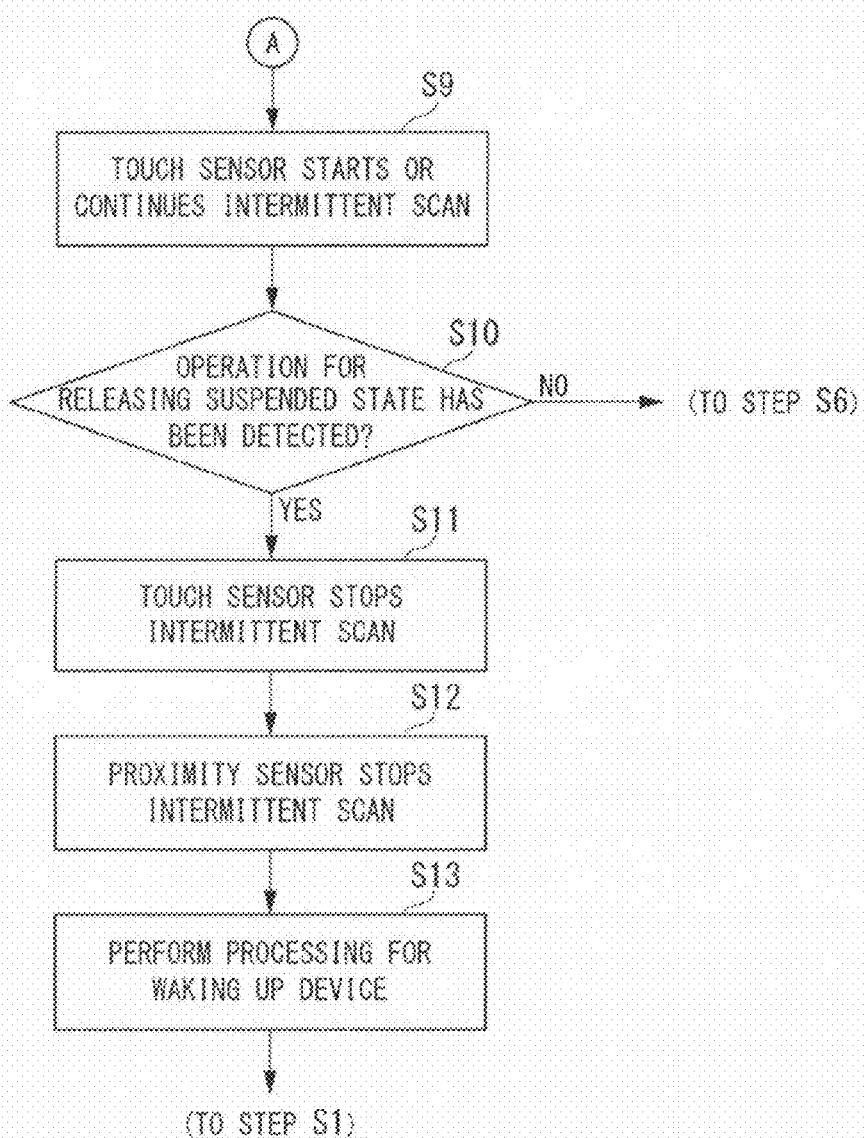
FIG. 5 illustrates another non-limiting exemplary flowchart for controlling aspects of a suspended state of a terminal device, according to certain embodiments.

Next, FIG. 5 illustrates a non-limiting exemplary flowchart for controlling aspects of a suspended state of a terminal device, according to certain embodiments.

Referring to FIG. 5, the controller 3 controls the touch sensor 71 via the touch sensor driver 72 to start or continue intermittent scanning of the touch sensor 71. As discussed above with respect to the processing of FIG. 4, the processing at step S9 is performed in a case when the proximity sensor 13 does not detect an object within the predetermined proximity of the terminal device 100 at step S4 and subsequently does not detect a change in detection state at step S6 (e.g., the terminal device 100 is initially determined not to be stored in the user's pocket and has not later transitioned to storage within the user's pocket). Additionally, the processing at step S9 may occur when the proximity sensor 13 at step S4 determines that an object is within the predetermined proximity of the terminal device 100 and subsequently the controller 3 determines that the detection state of the proximity sensor has changed at step S5 (e.g., the terminal device 100 is detected to be within the user's pocket and later transitions outside of the user's pocket).

At step S10, the controller 3 determines whether an operation for releasing the suspended state of the terminal device 100 has been detected. Exemplary operations for releasing the suspended state of the terminal device 100 include a touch operation detected on the touch panel 7. If the controller 3 at step S10 determines that an operation for releasing the suspended state has not been detected, the processing progresses back to step S6 of FIG. 4. Otherwise, the controller 3 controls the touch sensor 71 via the touch sensor driver 72 such that the touch sensor 71 stops the intermittent scan.

At step S12, a controller 3 controls the proximity sensor 13 via the proximity sensor driver 14 to stop the intermittent scanning of the proximity sensor 13.

At step S13, the controller 3 performs processing for waking up the terminal device 100, and the process returns to step S1 of FIG. 4.

Next, FIGS. 6A and 6B illustrate non-limiting examples of proximity sensor scan rates, according to certain embodiments.

Referring first to FIG. 6A, FIG. 6A illustrates an exemplary scan rate of the proximity sensor 13 in a normal state. In this example, the scan rate of the proximity sensor 13 is 50 Hz. Referring now to FIG. 6B, FIG. 6B illustrates a scan rate of the proximity sensor 13 when the proximity sensor 13 is in an intermittent scan state. In the example of FIG. 6B, the intermittent scan rate is 10 Hz. As discussed throughout the present disclosure, the proximity sensor 13 may be controlled based on processing described herein such that the scan rate of the proximity sensor 13 changes from the normal scan rate of FIG. 6A to the intermittent scan rate of FIG. 6B. The skilled artisan will appreciate that the scan rates illustrated in FIGS. 6A and 6B are provided merely for illustration purposes and that values given for scan rate should not be construed as limiting.

Figure 7A:
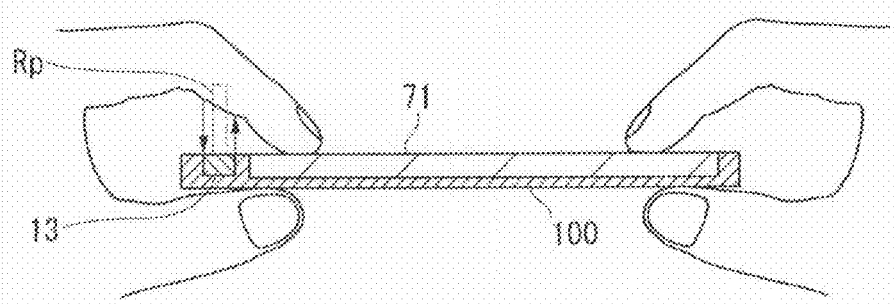
FIGS. 7A through 7C illustrate a non-limiting example of setting a detection possible range of a proximity sensor, according to certain embodiments.
Figure 7B:
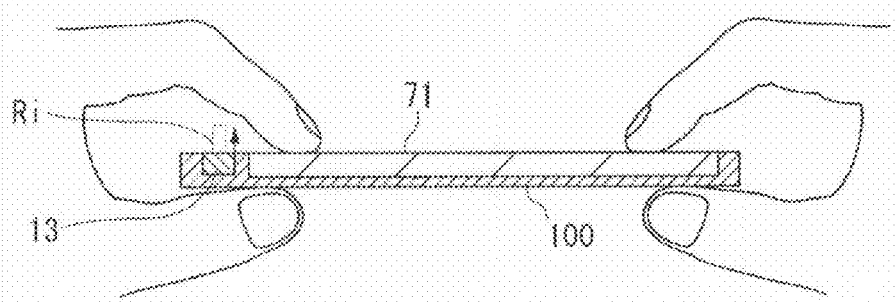
Figure 7C:
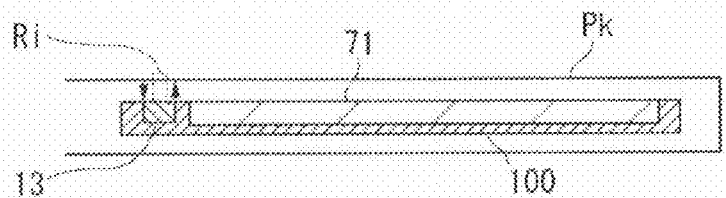

Next, FIGS. 7A through 7C illustrate a non-limiting example of setting a detection possible range of a proximity sensor, according to certain embodiments.

Referring first to FIG. 7A, FIG. 7A illustrates a state in which a user holds the terminal device 100 on opposing ends such that the terminal device 100 faces sideways. In this example, the proximity sensor 13 is located at the left-hand side of the terminal device 100, with a detection possible range Rp illustrated as a dotted line above the proximity sensor 13. The detection possible range Rp illustrated in FIG. 7A represents a typical detection possible range corresponding to a case where the touch panel 71 is turned off when a user's face is detected within the detection possible range Rp, such as when the user holds the terminal device 100 to his or her ear during a telephone call. In this case, the detection possible range Rp is selected such that a user's face will likely be detected during a phone call and therefore, the detection of the user's face within the detection possible range Rp prevents the user's face from inadvertently performing a touch operation on the touch panel 71 during the phone call. However, when the detection possible range Rp is applied according to aspects of the present disclosure, the likelihood of the proximity sensor 13 detecting a user's finger in a case such as that illustrated in the example of FIG. 7A becomes high. Moreover, the detection possible range Rp illustrated in FIG. 7A may be unsuitable for a case in which it is desirable to detect when the terminal device 100 is stored within a user's pocket, bag, or other storage container.

Therefore, as shown in the non-limiting example of FIG. 7B, a detection possible range Ri of the proximity sensor 13 is set so that it is of a narrower range than the detection possible range Rp illustrated in the example of FIG. 7A. As illustrated in FIG. 7B, the detection possible range Ri precludes the detection of the user's fingers when holding the terminal device 100 sideways as in the figure. However, the detection of the terminal device 100 being stored in, for example, a user's pocket may still be detected by the proximity sensor 13 using the detection possible range Ri.

FIG. 7C illustrates an exemplary case in which the terminal device 100 is stored in a user's pocket Pk. As illustrated in the figure, the detection possible range Ri may be selected such that it is slightly greater than the typical range from a front surface of the terminal device 100 to a surface of the pocket Pi interior. Accordingly, when the detection possible range Ri is chosen such as in the illustration of FIG. 7C, a detection of when the terminal device 100 enters and/or exits the user's pocket Pk may be detected while reducing the likelihood of detecting the user's hands during normal operation of the terminal device, such as in the example of FIG. 7B.

As a non-limiting example of a ratio of the possible detection range Ri with respect to conventional detection ranges such as the detection possible range Rp in FIG. 7A, the detection possible range Ri may, in certain embodiments, be one-third to one-fifth the range of typical detection ranges of proximity sensors (i.e., sensors configured to detect a user's face when operating a terminal device, for example, during a telephone call). The skilled artisan will appreciate that the exemplary ratios discussed herein are not limiting, and an actual value of proximity sensor detection range may be set and/or adjusted based on the application.

In certain embodiments, the detection possible range Ri is selected by the controller 3 when performing object scanning with the proximity sensor 13 while in the suspended state. In certain embodiments, the detection possible range Rp is selected by the controller 3 when performing object scanning with the proximity sensor 13 while in the awake state. That is, the controller 3 may, in certain embodiments, detect objects at a lower proximity range when the terminal device is in the suspended state than when the terminal device is in an awake state. Therefore, the proximity sensor 13 may still effectively detect a user's face during a phone call while in the awake state, but the lower detection possible range may be applied when the device is in the suspended state and the detection of a face during a phone call is inapplicable.

Next, FIGS. 8A through 8C illustrate a non-limiting example of proximity sensor and touch sensor scanning operations according to the exemplary flowcharts illustrated in FIGS. 4 and 5. In particular, FIG. 8A illustrates an example of the scanning operation of the proximity sensor 13 in accordance with the control methods illustrated in FIGS. 4 and 5, FIG. 8B illustrates an example of scanning operation of the touch sensor 71 in accordance with the control methods illustrated in FIGS. 4 and 5, and FIG. 8C illustrates a state of the system during the processing described in this example. As illustrated in FIG. 8C, the terminal device 100 is assumed to remain in the suspended state throughout the duration of the processing described in this example. As shown in FIG. 8A, the proximity sensor 13 implements a normal scan rate when determining whether an object is within a predetermined proximity of the terminal device 100 (e.g., within the detection possible range Ri) while the terminal device 100 is in the suspended state. While the terminal device 100 is in the suspended state and an object non-detection state exists with respect to the proximity sensor 13, the touch sensor 71 performs scanning operations at an intermittent scan rate. Referring to FIG. 8A, when the proximity sensor 13 determines that an object is within the predetermined proximity of the terminal device 100 (i.e., the detection state changes from an object non-detection to an object detection state), the intermittent scan rate of the touch sensor 71 is stopped, as shown in FIG. 8B. The stopping of the intermittent scanning by the touch sensor 71 is continued until the detection state of the object by the proximity sensor 13 changes (i.e., until the proximity sensor 13 no longer detects an object within the predetermined proximity, thereby transitioning from object detection state to object non-detection state). That is, the intermittent scanning of the touch sensor 71 is restarted at a timing at which the detection of the proximity sensor 13 changes from an object detection state to an object non-detection state.

According to features of the preceding examples, in certain embodiments the terminal device 100 may be stored, for example, in a user's pocket or bag, in which case the proximity sensor 13 determines that the terminal device 100 is in an object detection state and therefore, the controller 3 controls the touch sensor 71 such that an intermittent scan of the touch panel 7 is not performed. Accordingly, when the touch sensor 71 detects the human body on the other side of the cloth in the pocket, detects an object in a bag, etc., a condition in which the terminal device is awoken from the suspended state accidentally does not occur.

Figure 9:
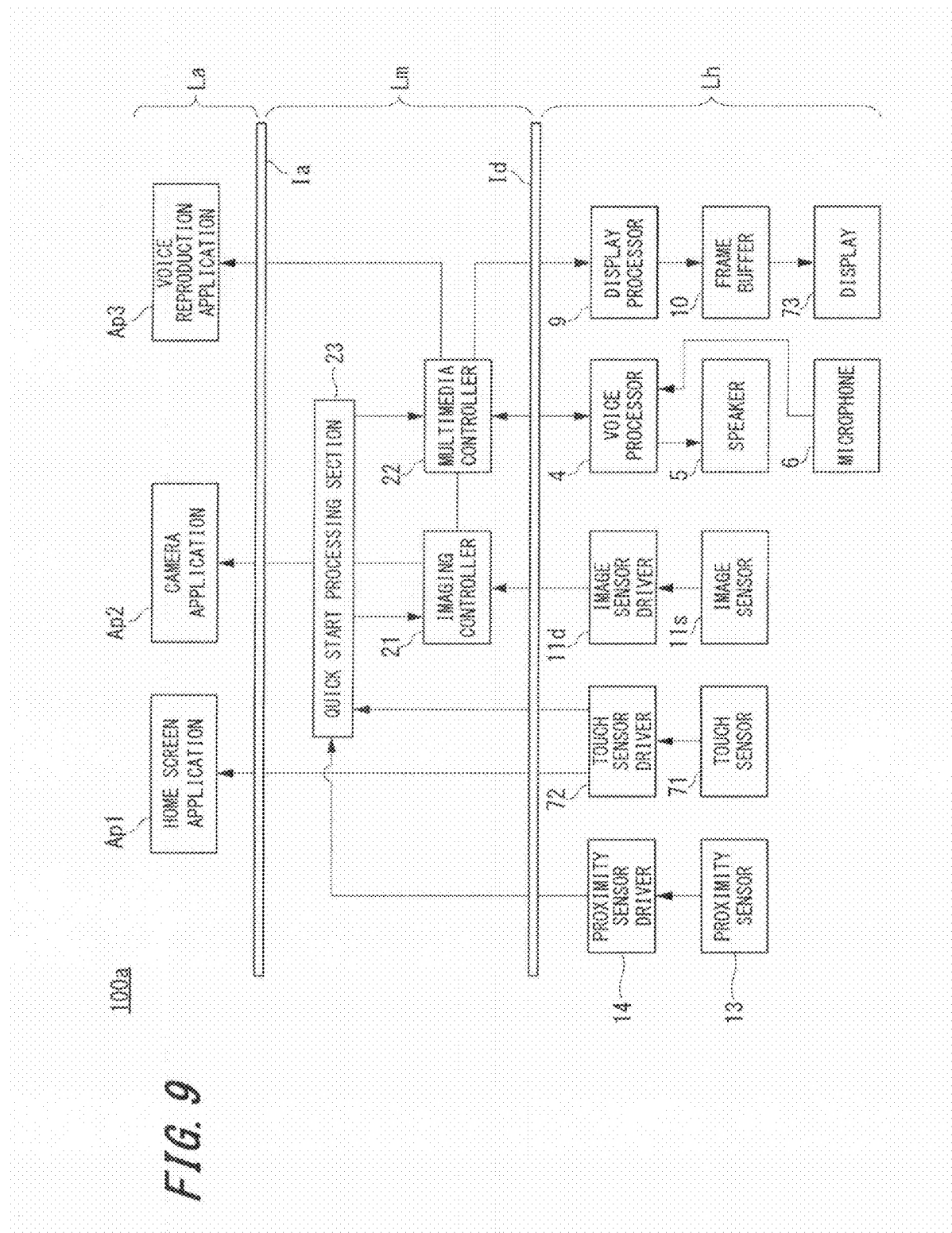
FIG. 9 illustrates a non-limiting example of a layer structure for a terminal device that performs processing related to the control of a suspension state based on a transition from an object detection state to an object non-detection state, according to certain embodiments.

Next, in certain embodiments, the controller 3 may be configured such that a terminal device in accordance with the present disclosure may be released from a suspended state when it is detected that the terminal device transitions from an object detection state to an object non-detection state, such as the case when the user removes the terminal device from his or her pocket. FIG. 9 illustrates a non-limiting example of a layer structure for a terminal device 100a, which performs processing related to the control of the suspension state based on a transition from an object detection state to an object non-detection state, according to certain embodiments.

Elements illustrated in the example of FIG. 9 may correspond to elements previously illustrated and discussed with respect to FIG. 3, and a duplicated discussion of repeated elements is omitted here for brevity. However, it is noted that the point in which the structure shown in FIG. 9 differs from the structure shown in FIG. 3 is that the detection result of the proximity sensor driver 14 is directly input into the quick start processing section 23. Accordingly, the quick start processing section 23, in certain embodiments, may generate a signal for releasing the terminal device 100a from a suspended state based on a detected transition from an object detected state to an object non-detected state by the proximity sensor 13. Moreover, in conjunction with the processing related to releasing the terminal device 100a from the suspended state, the quick start processing section 23 may perform processing to simultaneously start processing for an application, or to otherwise activate an element in the terminal device 100a, when the proximity sensor 13 determines that the terminal device 100a transitions from the object detection state to the object non-detection state. Exemplary aspects of a "quick start" performed by the quick start processing section 23 were discussed previously.

Figure 10:
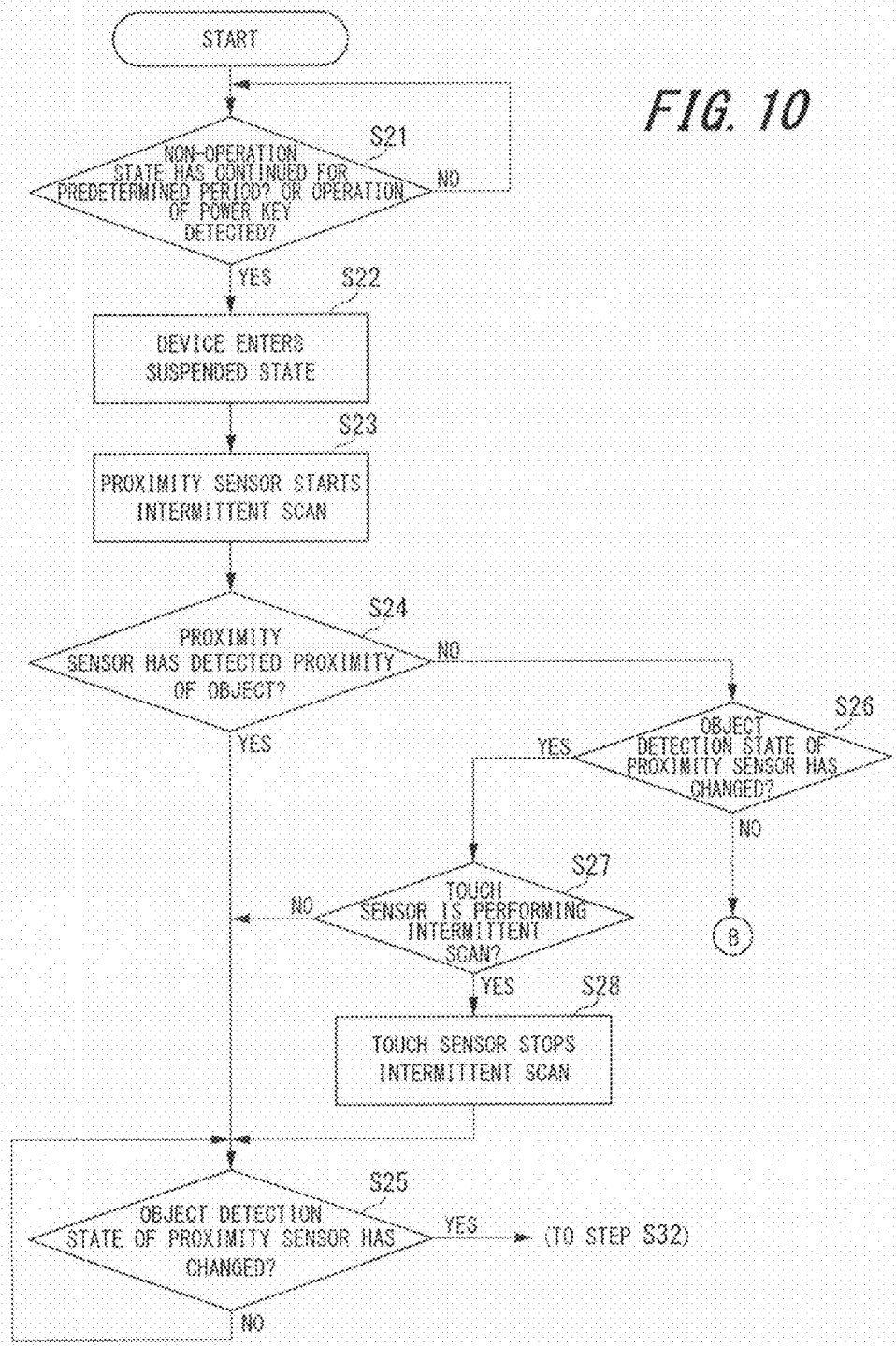
FIG. 10 illustrates a non-limiting exemplary flowchart illustrating a process of controlling a suspended state of a terminal device based on a detected transition to an object non-detection state, according to certain embodiments.

Next, FIG. 10 illustrates a non-limiting exemplary flowchart illustrating a process of controlling a suspended state of a terminal device based on a detected transition to an object non-detection state, according to certain embodiments.

The processing in the example of FIG. 10 begins at step S21, where the controller 3 determines whether a non-operation state of the touch panel 7 has continued for a predetermined period, or whether a detection of an operation of the power key 81 is detected. If the controller 3 at step S21 determines that the non-operation state of the touch panel 7 has continued in excess of the predetermined time period and an operation of the power key 81 has not been detected, the controller 3 continues monitoring for the transition from the non-operation state at step S21. Otherwise, the controller 3 at step S22 performs processing for transitioning the terminal device 100a to the suspended state.

At step S23, the controller 3 controls the proximity sensor 13 via the proximity sensor driver 14 such that an intermittent scan rate operation of the proximity sensor 13 begins. The intermittent scan rate started at step S23 in this example may, in certain embodiments, be a higher rate than the intermittent scan rate discussed for preceding examples. For example, the intermittent scan rate started at step S23 may be higher than the scan rate started at step S3 of FIG. 4. An increased scan rate relative to the preceding examples may, for example, provide for increased sensitivity when determining whether the terminal device 100a transitions from the object detection state to the object non-detection state. For example, an increased scan rate relative to the preceding examples may better detect the moment that the terminal device 100a is removed from a storage container such as a user's pocket or bag. Thus, the moment at which the terminal device 100a is removed from the storage container can then be associated with the time at which the terminal device 100a transitions to the object non-detection state. As a non-limiting example of the intermittent scan rate set at step S23, the intermittent scan rate of the proximity sensor 13 may be set to 100 Hz. However, this example value is merely provided for exemplary purposes and those of ordinary skill in the art will appreciate that an optimal value for scan rate may be determined based on tuning of the proximity sensors.

At step S24, it is determined whether an object is detected within a predetermined proximity of the terminal device 100a (i.e., whether the terminal device 100a is in the object detection state). In certain embodiments, the detection possible range Ri may be set to the predetermined range from which to determine whether the terminal device 100a is in the object detection state. A non-limiting example in which the terminal device 100a is determined to be in the object detection state occurs when the terminal device 100a is stored in the user's pocket or other storage container. An example in which the controller 3 determines that the terminal device 100a is in the object non-detection state occurs when the terminal device 100a is outside of the user's pocket or other storage container.

If the controller 3 determines that the terminal device 100a is in the object detection state at step S24, the controller 3 at step S25 determines whether the object detection state of the proximity sensor 13 has changed. An example in which the object detection state would have changed at step S25 is the case in which the terminal device 100a is stored in the user's pocket or other storage container and is subsequently removed from the pocket or storage container. If it is determined at step S25 that the object detection state has not changed, the controller 3 continues monitoring for the change in object detection state at step S25. Otherwise, the process proceeds to step S32, which will be discussed in greater detail with respect to FIG. 11.

Referring back to step S24, if the controller 3 at step S24 determines that the terminal device 100a is in the object non-detection state, the controller 3 at step S26 determines whether the object detection state of the proximity sensor 13 has changed. If the controller 3 at step S26 determines that the object detection state has not changed, the processing progresses to the connector B, which will be discussed later with respect to FIG. 11. An example in which the object detection state would not have changed at step S26 includes a case in which the terminal device 100a is outside of the user's pocket or other storage container and remains outside of the pocket/storage container.

If the controller 3 at step S26 determines that the object detection state has changed, the controller 3 at step S27 determines whether the touch sensor 71 is performing a scanning operation at the intermittent scan rate. An example in which the object detection state would change at step S26 includes the case where the terminal device 100a is initially outside of the user's pocket or other storage container and is subsequently placed within a pocket or storage container.

If it is determined at step S27 that the touch sensor 71 is not performing scanning at the intermittent scan rate, the processing progresses to step S25. Otherwise, at step S28 the controller 3 via the touch sensor driver 72 stops the intermittent scan operation of touch sensor 71.

Figure 11:
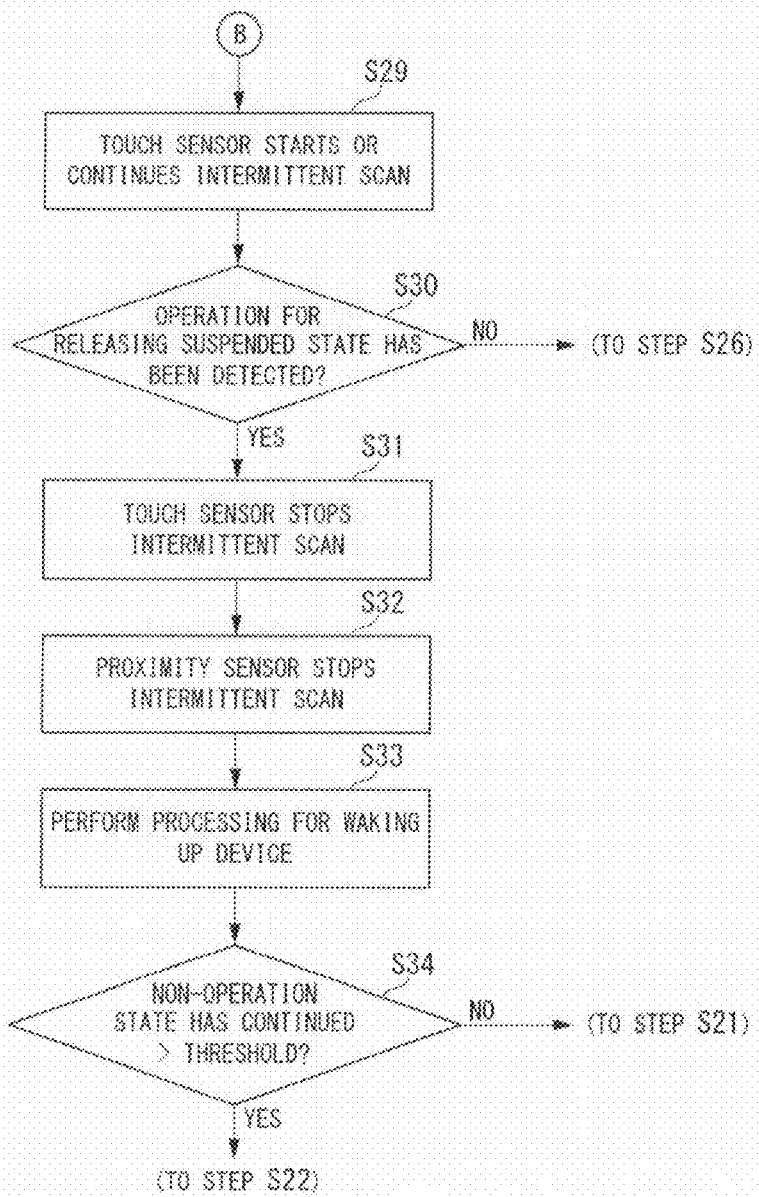
FIG. 11 illustrates another non-limiting exemplary flowchart for controlling a suspended state of a terminal device, according to certain embodiments.

Next, FIG. 11 illustrates another non-limiting exemplary flowchart for controlling a suspended state of a terminal device, according to certain embodiments. As discussed previously, the exemplary process illustrated in FIG. 11 begins when an object non-detection state is determined at step S24 and a determination that the object detection state has not changed is made at step S26 of FIG. 10. Under this condition, the controller 3 at step S29 controls the touch sensor 71 via the touch sensor driver 72 such that an intermittent scan operation is started or continued.

At step S30, the controller 3 determines whether an operation for releasing the suspended state of the terminal device 100a has been detected. If no operation for releasing the suspended state is detected at step S30, the process returns to step S26 of FIG. 10. Otherwise, if an operation for releasing the suspended state is detected at step S30, the intermittent scanning by touch sensor 71 is stopped by the touch sensor driver 72 via the controller 3 at step S31.

At step S32, the intermittent scan operation of the proximity sensor 13 is stopped by the proximity sensor driver 14 via the controller 3.

At step S33, the controller 3 performs a process of waking the terminal device 100a (i.e., releasing the terminal device 100a from the suspended state).

At step S34, the controller 3 determines whether a non-operation state of the terminal device 100a has continued for greater than a predetermined time at threshold. As a non-limiting example, the controller 3 at step S34 may determine whether the non-operation state has continued for greater than 3 seconds. It should be appreciated, however, that any arbitrary value for the time threshold may be selected, and the time value of 3 seconds applied in this example is in no way limiting.

If the controller 3 at step S34 determines that the non-operation state has not continued for greater than the predetermined time threshold, the process proceeds to step S21 of FIG. 10. Otherwise, if it is determined that the non-operation state has continued for greater than the predetermined time threshold, the process proceeds to step S22 of FIG. 10. That is, when it is determined that the non-operation state continues for greater than the predetermined time threshold, the process which returns the terminal device 100a to a suspended state is performed again.

Figure 12:
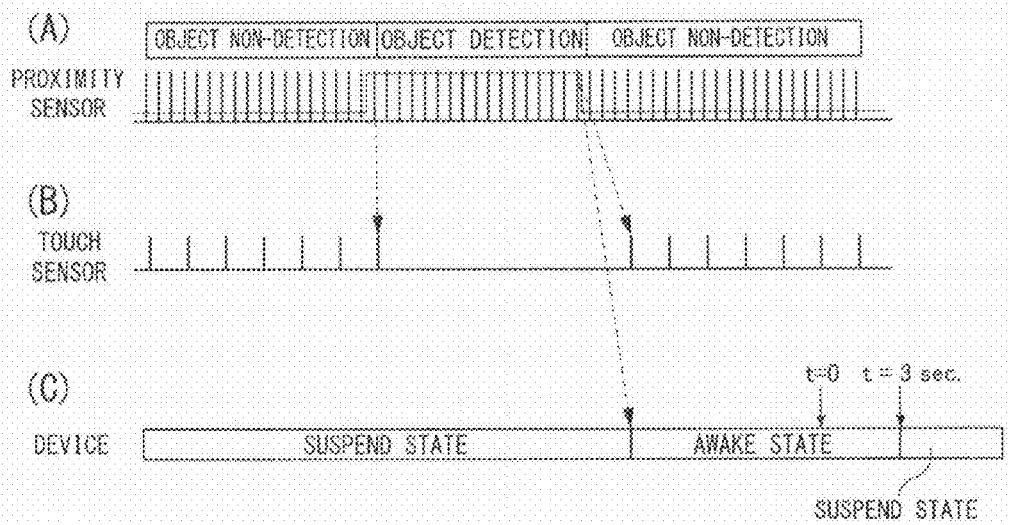
FIG. 12 illustrates an exemplary scanning operation of a proximity sensor and a touch sensor operating in accordance with the exemplary control methods illustrated in FIGS. 10 and 11.

Next, FIG. 12 illustrates an exemplary scanning operation of a proximity sensor and a touch sensor operating in accordance with the exemplary control methods illustrated and discussed above with respect to FIGS. 10 and 11. Specifically, FIG. 12A illustrates an example of a scanning operation of the proximity sensor 13 operating in accordance with the exemplary control methods illustrated and discussed above with respect to FIGS. 10 and 11; FIG. 12B illustrates an example of a scanning operation of the touch sensor 71 operating in accordance with the control methods illustrated and discussed above with respect to FIGS. 10 and 11; and FIG. 12C illustrates a state of the terminal device

100*a* during a time in which the exemplary control methods of FIGS. 10 and 11 are executed.

As shown in FIG. 12A, the proximity sensor 13 implements a normal scan rate for detecting whether the terminal device 100*a* has been stored in a pocket, a bag, or other storage container at a time in which the terminal device 100*a* is in the suspended state. At the same time, the touch sensor 71 performs a scanning operation at an intermittent scan rate while the terminal device 100*a* is in the suspended state and an object non-detection state exists.

As illustrated in FIG. 12B, when the object detection state transitions from the object non-detection state to the object detection state, the intermittent scanning of the touch sensor 71 stops. The stopping of the intermittent scan by the touch sensor 71 continues until the detection state of an object by the proximity sensor 13 changes (i.e., until the proximity sensor 13 does not detect an object any longer). That is, the intermittent scan operation by the touch sensor 71 is restarted at a timing corresponding to the time at which the object detection state of the proximity sensor 13 shown in FIG. 12A changes from the object detection state to the object non-detection state. Additionally, as illustrated in FIG. 12C, the terminal device 100*a* transitions from the suspended state to the awake state at the time corresponding to the transition from the object detection state to the object non-detection state. While the terminal device 100*a* is in the awake state, the controller 3 determines whether a non-operation condition of the terminal device 100*a* continues for greater than a predetermined time threshold (3 seconds in this example). When the controller 3 determines that greater than 3 seconds passes without a detection of a touch operation by the touch sensor 71, the terminal device 100*a* transitions back to the suspended state.

According to certain embodiments discussed above with respect to FIGS. 9-12, when a detection state of the proximity sensor 13 changes from an object detection state to an object non-detection state (e.g., when the terminal device 100*a* is removed from the user's pocket or bag), the terminal device 100*a* is immediately released from the suspended state. Therefore, a user does not necessarily have to perform a separate operation in order to release the terminal device 100*a* from the suspended state, but rather the user can immediately use the terminal device 100*a* simply by removing the terminal device 100*a* from his or her pocket or bag. Further, even in the case in which the detection state of the proximity sensor 13 changes from an object detection state to an object non-detection state, when no operation (e.g., a touch operation and/or an operation of the operating keys 8) is performed for a predetermined time period, the controller 3 controls the terminal device 100*a* such that the device returns to the suspended state. Therefore, in the case in which the proximity sensor 13 detects an object within the predetermined proximity of the terminal device 100*a* at a time in which the user does not necessarily desire to release the terminal device 100*a* from the suspended state (e.g., when the proximity sensor 13 detects objects within the user's pocket and/or bag, or the terminal device 100*a* inadvertently contacts objects within the user's pocket and/or bag causing an operation of the operating keys 8), the terminal device 100*a* may be returned to the suspended state after the predetermined time period such that power is not unnecessarily consumed by the terminal device 100*a* when the user did not intend to release the terminal device 100*a* from the suspended state.

Figure 13:
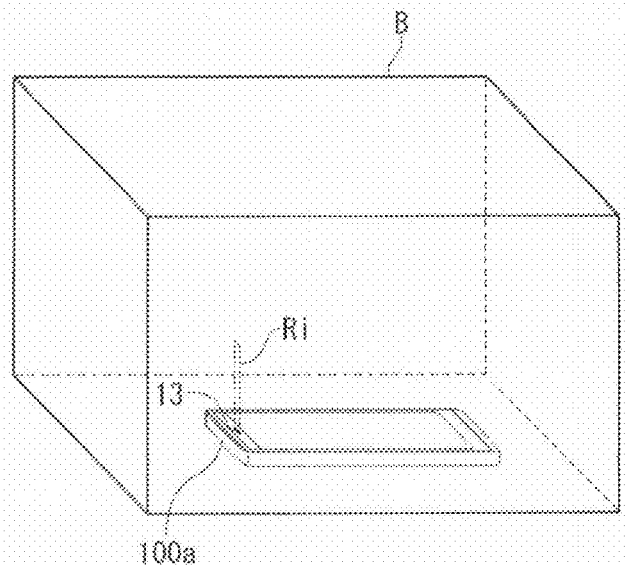
FIG. 13 illustrates a non-limiting example of transitioning a terminal device back to a suspended state in response to not detecting an operation of the terminal device following a predetermined time period, according to certain embodiments.

FIG. 13 illustrates a non-limiting example of transitioning a terminal device back to a suspended state in response to not detecting an operation of the terminal device following a predetermined time period, according to certain embodiments. In this example, the terminal device 100*a* is shown stored within a user's bag B in a condition in which an object is not detected within the predetermined proximity corresponding to the detection possible range Ri. In this case, according to the exemplary processing illustrated in FIGS. 10 and 11, since no object is detected within the detection possible range Ri by the proximity sensor 13, the determination at step S24 of FIG. 10 is determined to be "NO," and a determination at step S26 is also determined to be "NO." As a result, the processing transitions to step S29 of FIG. 11, where intermittent scanning of the touch sensor 71 starts or continues. Therefore, when some object exerts an influence such that an electrostatic capacitance is detected by the touch sensor 71 by directly contacting the touch sensor 71 and/or coming within a predetermined detectable range of the touch sensor 71 after the intermittent scan of the touch sensor 71 is started at step S29, the touch sensor 71 may detect the presence of the object and consequently the terminal device 100*a* may be released from the suspended state. However, according to the processing of FIGS. 10 and 11, the terminal device 100*a* will transition back to the suspended state when no operation of the terminal device (e.g., a touch operation) is detected within a predetermined time period (e.g., 3 seconds) and therefore, in the case in which a touch operation is inadvertently detected following the release of the suspended state, the terminal device 100*a* may be automatically transitioned back to the suspended state to prevent unnecessary power consumption of the terminal device 100*a*.

Next, the preceding examples describe the case in which a detection of a touch operation and/or an operation of the operating keys 8 releases a terminal device from a suspended state. However, the present disclosure is not limited to performing processing related to the control of the suspended state based on a detection of a touch operation and/or operation of the operating keys 8. In certain embodiments, a detection of an audio input may be applied for controlling the suspended state of a terminal device.

Figure 14:
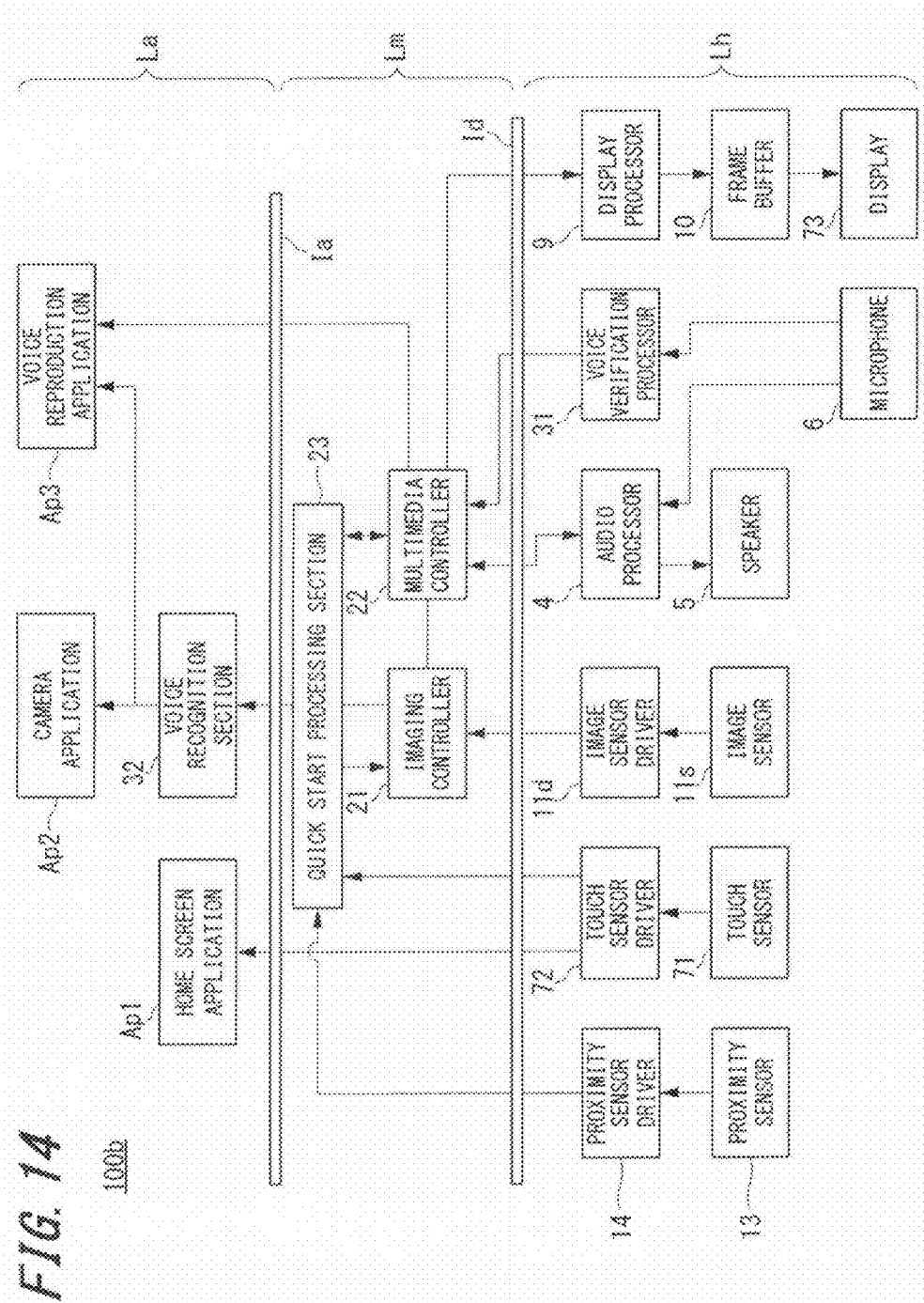
FIG. 14 illustrates a non-limiting example of a layer structure of a terminal device that includes features related to the control of a suspended state based on an audio input, according to certain embodiments.

FIG. 14 illustrates a non-limiting example of a layer structure of a terminal device 100*b*, which includes features related to the control of a suspended state based on an audio input. The terminal device 100*b* may be assumed to have a similar external structure to the terminal device 100 illustrated in FIG. 1. Additionally, the terminal device 100*b* includes elements in the layer structure illustrated in FIG. 14 that were previously described in preceding examples with respect to terminal devices 100 and 100*a*. Accordingly, a repeated description of the duplicated elements will not be provided here. It is noted that the exemplary structure illustrated in FIG. 14 differs from the exemplary structure of FIG. 3 in that FIG. 14 includes a voice verification processor 31 and a voice recognition section 32.

In certain embodiments, the voice verification processor 31 determines whether an audio input is received from the microphone 6. When the voice verification processor 31 determines that an audio input (e.g., a voice command) was received for releasing the terminal device 100*b* from a suspended state, the voice verification processor 31 generates a notification signal to the multimedia controller 22. In response to receiving the notification signal, the multimedia controller 22 may retrieve the audio signal input to the microphone 6 from the audio processor 4. In certain embodiments, the multimedia controller 22 may compare the received voice input from the audio processor 4 to a predetermined speech pattern stored in the memory 12. When the multimedia controller 22 determines that the received audio input matches the predetermined voice pattern stored in the memory 12, the multimedia controller 22 notifies the quick processing section 23, and the quick processing section 23 starts the voice recognition section 32 while releasing the terminal device 100b from the suspended state.

Following the quick start initiation of the voice recognition section 32, the voice recognition section 32 may analyze newly received audio input from the microphone 6 to determine whether the newly received audio input corresponds to an audio command for executing an application, and the voice recognition section 32 may start the application depending on the analysis result. For example, a user may awaken the terminal device 100b from the suspended state by speaking a voice command into the microphone 6, such as saying "Hello." As another example, a user may speak a voice command into the microphone 6 instructing the terminal device 100b to place a telephone call to a particular telephone number (e.g., "call 555-XXXX"). The voice recognition section 32 may analyze the input voice command instructing the terminal device 100b to call the telephone number, and the voice recognition section 32 may start an application for executing a telephone call based on the result.

In certain embodiments in which an audio input may be applied to control a suspended state of a terminal device, when the proximity sensor 13 detects an object within a predetermined proximity of the terminal device, the voice scanning by the voice verification processor 31 may be stopped.

Figure 15:
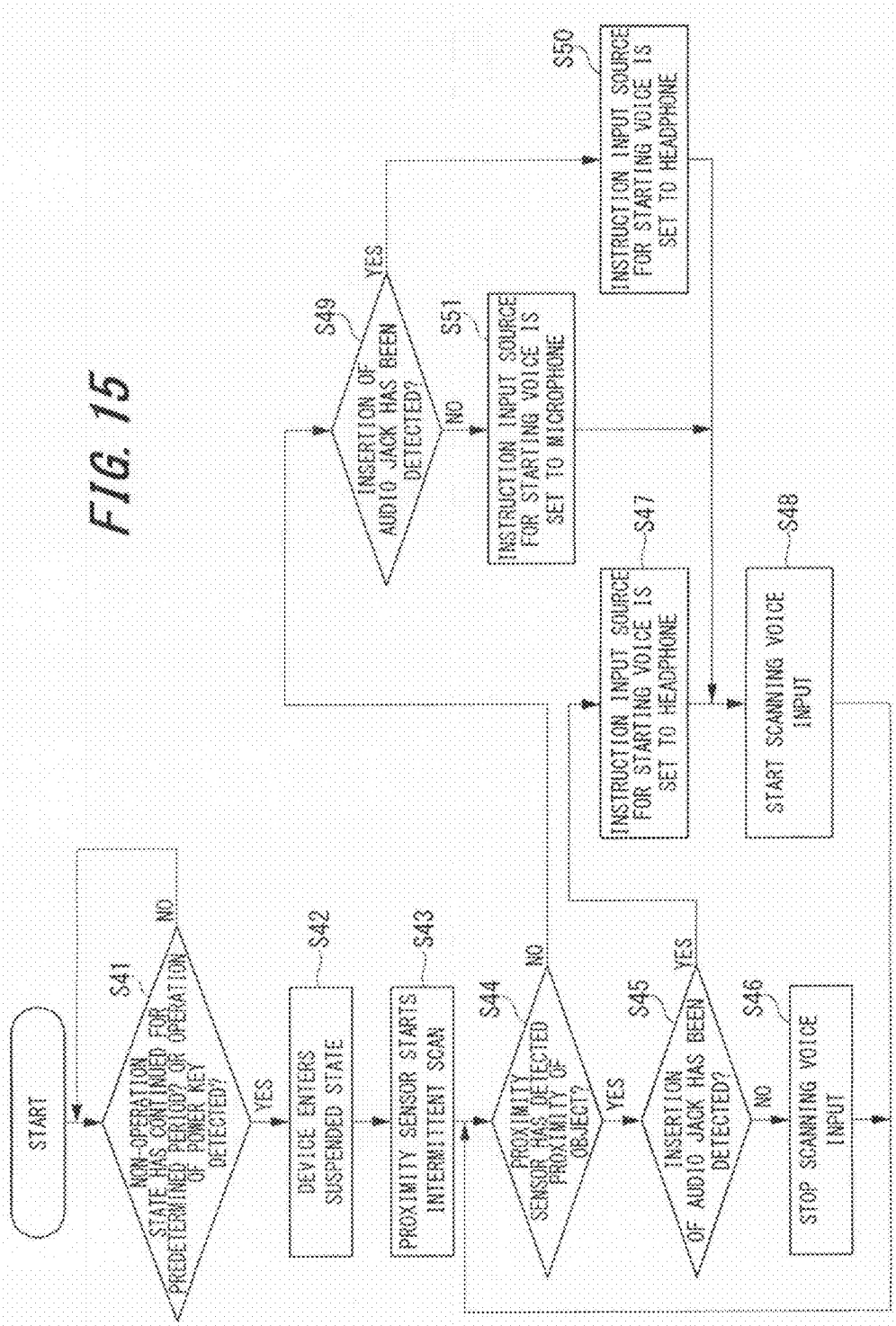
FIG. 15 illustrates a non-limiting exemplary flowchart for controlling a suspended state of a terminal device based on an audio input, according to certain embodiments.

Next, FIG. 15 illustrates a non-limiting exemplary flowchart for controlling a suspended state of a terminal device based on an audio input, according to certain embodiments.

At step S41, the controller 3 determines whether a non-operation state with respect to the touch panel 7 has continued for greater than a predetermined time period, or whether an operation of the power key 81 is detected. If the controller 3 determines at step S41 that the non-operation state continues for greater than the predetermine time period and/or the operation of the power key 81 is not detected, the controller 3 continues monitoring the operation state of the terminal device 100b at step S41.

Otherwise, at step S42 the controller 3 performs processing such that the terminal device 100b enters the suspended state.

At step S43, the controller 3 controls the proximity sensor 13 via the proximity sensor driver 14 such that the proximity sensor 13 starts a scanning operation at an intermittent scan rate.

At step S44, the controller 3 determines, based on inputs from the proximity sensor 13, whether an object is detected within a predetermined proximity of the terminal device 100b. For example, the controller 3 may determine that an object has been detected within a predetermined proximity when the proximity sensor 13 detects an object (e.g., the interior of a pocket) within the detection possible range Ri.

If the controller 3 determines at step S44 that an object is detected within the predetermined proximity of the terminal device 100b, the controller 3 at step S45 performs a determination as to whether a headphone audio jack has been inserted into an audio input terminal of the terminal device 100b (e.g., as mentioned previously, an audio input terminal configured to accept an audio jack may be included in the audio processor 4). It is noted that the present disclosure is not limited to the detection of a physical audio jack being inserted into the terminal device 100b. In certain embodiments, the controller 3 at step S45 may perform a determination as to whether a wireless audio output device such as a Bluetooth headset has established a connection with the terminal device 100b. However, for simplicity, examples discussed herein assume that a physical audio input jack is detected as being inserted into the terminal device.

If the controller 3 determines at step S45 that an audio jack has not been inserted into the terminal device 100b, the controller 3 at step S46 performs processing such that scanning for an audio input command for releasing the terminal device 100b from the systemic state is stopped.

Otherwise, if the controller 3 at step S45 determines that an audio jack has been inserted into the terminal device 100b, the controller 3 at step S47 sets the instruction input source for executing processing based on voice commands to "headphone." In certain embodiments, it may be assumed that the headphones connected to the terminal device 100b via the audio jack perform processing for both the input and the output of audio. For example, the headphones may include the microphone in line with the headphone jack such that a user may perform voice commands for executing processing by the controller 3.

At step S48, the controller 3 starts processing for scanning audio input commands for releasing the terminal device 100b from the suspended state.

Referring back to step S44, if the controller 3 at step S44 determines that an object is not detected within the predetermined proximity of the terminal device 100b (e.g., the terminal device 100b is outside of user's pocket or bag), the controller 3 at step S49 determines whether an audio jack for a headphone has been inserted into the terminal device 100b.

If the controller 3 at step S49 determines that an audio jack for a headphone has been inserted into the terminal device 100b, the controller 3 sets the instruction input source for audio input commands to control the systemic state of the terminal device 100b to "headphone" input, similar to the processing performed at step S47. Otherwise, the controller 3 at step S51 sets the instruction input source for audio input commands to the microphone 6. Following either step S50 or step S51, the process proceeds to step S48.

According to the features described above with respect to controlling a suspended state of a terminal device based on audio input commands, because the scanning of an audio input is not performed when an object is not detected within the predetermined proximity of the terminal device (e.g., when the terminal device is stored in the user's pocket or bag), the terminal device is not inadvertently released from the suspended state when an audio input that is not intended to wake the terminal device is detected. For example, an audio input may be inadvertently detected by the microphone 6, in which case the terminal device may be released from the suspended state unintentionally. However, according to the processing described above with respect to FIG. 15, such a case of an inadvertent release of the suspended state of the terminal device may be prevented.

Next, in certain embodiments, a suspended state of a terminal device may be controlled based on features of a distribution area corresponding to touch sensor outputs. For example, the suspended state of a terminal device may be controlled based on a detection of a user's palm covering and/or hovering over a touch panel display screen.

Figure 16A:
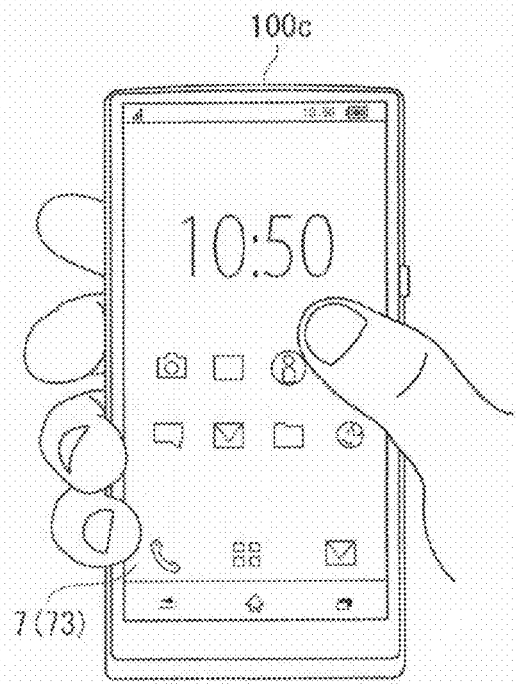
FIGS. 16A and 16B illustrate exemplary features of controlling a suspended state of a terminal device based on features of a touch sensor output distribution area, according to certain embodiments.

FIG. 16A illustrates an exemplary terminal device for controlling a suspended state based on a detected touch sensor output distribution area. The example of FIG. 16A illustrates a terminal device 100c in an awake state (i.e., the suspended state has been released), whereby a home screen interface is displayed on the display 73.

Figure 16B:
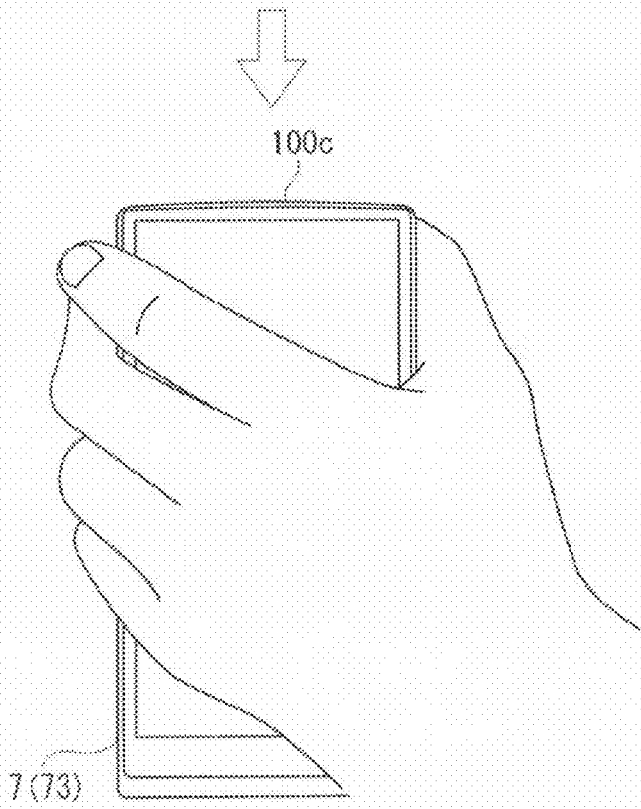

FIG. 16B illustrates a non-limiting example in which the terminal device 100c is transitioned to a suspended state based on the detection of a user's hand covering the touch panel 7. In this example, the distribution area of touch sensor outputs may be generated based on the detection of the user's hand covering the operation surface of the touch panel 7 as in FIG. 16B. In certain embodiments, features of the detected distribution area may be compared to threshold values such that a determination is made that the user is covering the touch panel 7 with her hand. For example, capacitance magnitudes and coordinate distribution may be compared to corresponding thresholds stored in the memory 12. As a result of the comparison between the distribution area and the threshold values, the controller 3 of the terminal device 100c may control processing of the device such that the device is transitioned from the awake state in FIG. 16A to the suspended state shown in FIG. 16B.

Next, FIG. 17 illustrates a non-limiting example of a block diagram of a terminal device for controlling a suspended state based on features of a touch sensor output distribution area, according to certain embodiments. The internal structure of the terminal device 100c illustrated in FIG. 7 defers from the previous structure described for terminal devices 100, 100a, and 100b in that the proximity sensor 13 and a proximity sensor driver 14 are omitted in terminal device 100c. However, it should be appreciated that the internal structure according to any of the terminal devices described herein may be applied such that the controlling of the suspended state based on features of a touch sensor output distribution area may be performed. In other words, in certain embodiments, the proximity sensor 13 and/or the proximity sensor driver 14 may be unnecessary for controlling the suspended state based on features of a touch sensor output distribution area. Therefore, while the proximity sensor 13 and the proximity sensor driver 14 may be utilized in other processing related to the terminal device in which they operate, the elements are unnecessary with respect to the features related to the control of the suspended state based on features of a touch sensor output distribution area. Accordingly, the proximity sensor 13 and/or the proximity sensor driver 14 may be optionally omitted in this case.

Figure 18:
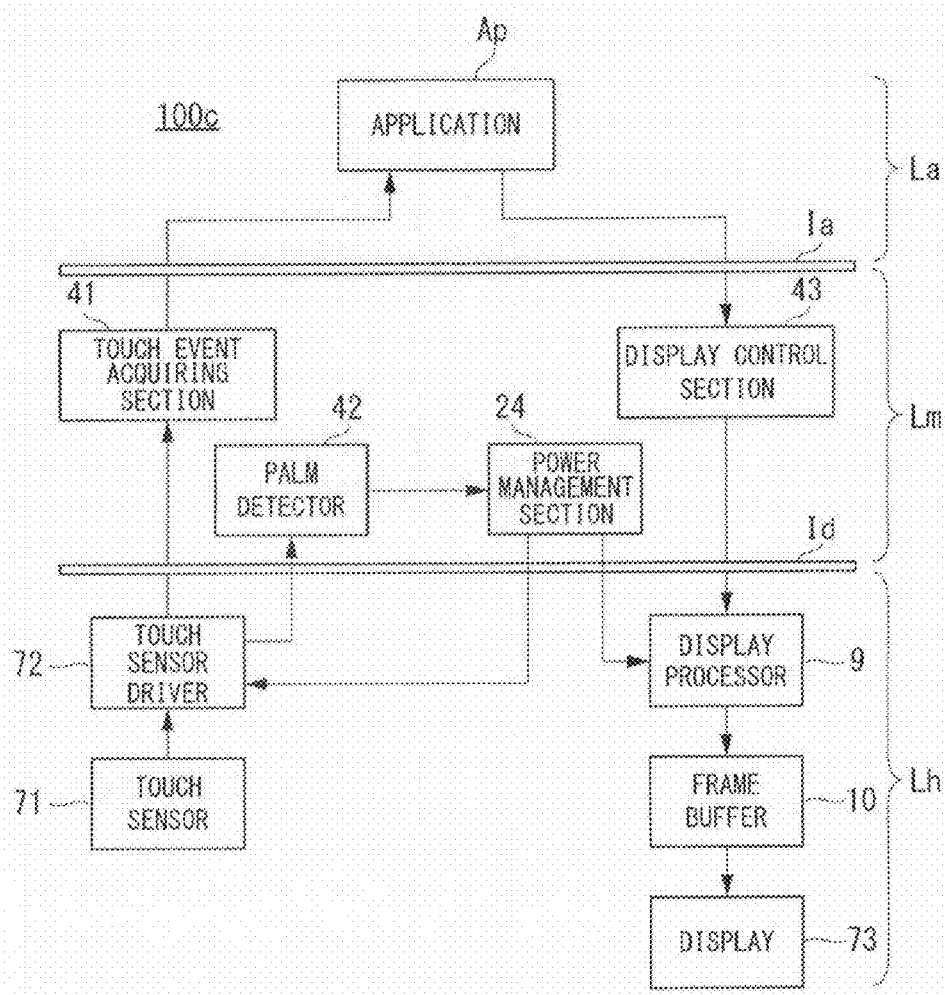
FIG. 18 illustrates a non-limiting example of a layer structure for a terminal device for controlling a suspended state based on features of a touch sensor output distribution area, according to certain embodiments.

Next, FIG. 18 illustrates a non-limiting example of a layer structure for a terminal device for controlling a suspended state based on features of a touch sensor output distribution area, according to certain embodiments.

As in previous examples, the layer structure of the terminal device 100e illustrated in FIG. 18 includes various modules in the application layer La, the middleware layer Lm, and the hardware layer Lh, and the interrelationships between modules of the terminal device 100c is illustrated in FIG. 18. As discussed in previous examples, in certain embodiments, the controller 3 may implement the processing features corresponding to the modules of the application layer La and the middleware layer Lm, and the controller 3 may also control the processing functions performed by the elements of the hardware layer Lh.

The hardware layer Lh includes the display processor 9, the frame buffer 10, the display 73, the touch sensor 71, and the touch sensor 72. As discussed previously, the touch panel 7 in which the touch sensor 71 and the touch sensor driver 72 are included may, in certain embodiments, be an electrostatic capacitance type touch panel device. However, the skilled artisan will appreciate that the processing described herein may be easily adapted such that other touch panel technologies are utilized. For simplicity, the present example assumes that a detected distribution area of touch sensor outputs corresponds to electrostatic capacitance values detected by the plurality of sensor included in the touch sensor 71. That is, touch sensors included at various coordinate positions across the touch panel 7 may detect variances in the presence and/or magnitude of electrostatic capacitance when, for example, the user's palm covers the touch panel 7. Variance in electrostatic capacitance magnitude in this example may, for example, be the result of variances in distance of the user's palm from the operation surface of the touch panel 7 when the user's palm is covering the touch panel 7. Similarly, variances in coordinate positions at which electrostatic capacitance values are detected when the user is covering the touch panel 7 with his or her hand may, for example, be the result of differences in the manner in which the user is holding the terminal device 100e, as well as differences in hand size between various users. Accordingly, the distribution area of touch sensor outputs generated by the touch sensor 71 and the touch sensor driver 72 may be compared, in certain embodiments, to threshold values of distribution area size (i.e. distribution of coordinates in which electrostatic capacitance values are detected) and/or electrostatic capacitance magnitudes. Based on the comparison result, a determination of whether an object such as a user's hand is covering at least a portion of the touch panel 7 may be determined.

Referring back to FIG. 18, the middleware layer Lm of the terminal device 100c may include, in certain embodiments, the power management section 24, a touch event acquiring section 41, a palm detector 42, and a display control section 43.

The touch event acquiring section 41 may determine a presence or absence of a touch operation based on electrostatic capacitance magnitude values and/or coordinate positions included in a distribution area acquired from the touch sensor 71 via the touch sensor driver 72. When a touch operation is detected, the touch event acquiring section 41 supplies the data included in the acquired distribution area to an application Ap included in the application layer La.

The palm detector 42 may receive an input related to the detected touch operation from the touch sensor driver 72. Based on an analysis of the received data from the touch sensor driver 72, the palm detector 42 may output an instruction to the power management section 24 in order to control the suspended state of the terminal device 100c. For example, in certain embodiments, the palm detector 42 may analyze the electrostatic capacitance magnitude values and/or the coordinate positions of a touch sensor output distribution area received from the touch sensor driver 72 and determine, based on features of the electrostatic capacitance magnitude and/or size of the distribution area, that a user's palm is covering the touch panel display 7. When the palm detector 42 determines that the user's palm is covering the touch panel 7, the palm detector 42 may output a signal to the power management section 24 indicating that the user's palm is covering the touch panel 7. Based on the receipt of the detection signal indicating that the user's palm is covering the touch panel 7, the power management section 24 may transmit a command to elements included in the terminal device 100c such that the elements transition to the suspended state. For example, the power management section 24 may transmit a command to the display 73 via the display processor 9 to secure power to the display 73. In certain embodiments, upon receiving the signal from the palm detector 42 indicating that the user's palm is covering the touch panel 7, the power management section 24 may transmit a command to the touch sensor driver 72 such that the scan rate of the touch sensor 71 is changed (e.g. the touch sensor driver 72 may change the scan rate of the touch sensor 71 from a normal scan rate to an intermittent scan rate).

In certain embodiments, the display control section 43 may perform control processing related to the display processor 9 and the display 73 based on inputs received from the application Ap.

Next, FIG. 19 illustrates a non-limiting example of a sequence diagram for performing processing to control a suspended state of a terminal device based on features of a touch sensor output distribution area, according to certain embodiments.

Referring to FIG. 19, the sequencing diagram starts at step S61 where the terminal device 100c is in the suspended state.

At step S62, the touch sensor 71 detects an operation for releasing the suspended state of the terminal device 100c. In response to detecting the operation for releasing the suspended state, the touch sensor 71 at step S63 transmits a request for an interruption wake-up signal to the touch sensor driver 72.

At step S64, the touch sensor driver 72 transmits a request for wake-up signal to the controller 3 of the terminal device 100c.

At step S65, the controller 3 starts processing for resuming normal operations and releasing the terminal device 100c from the suspended state.

The controller 3 at step S66 transmits an instruction to start resuming normal operations and release from the suspended state (i.e., "wake-up") to the touch sensor driver 72. In response to receiving the wake-up instruction from the controller 3 at step S66, the touch sensor driver 72 transmits a wake-up instruction to the touch sensor 71 at step S67. At step S68, the controller 3 transmits a wake-up instruction to the display processor 9. In response to receiving the instruction from the controller 3 at step S68, the display processor 9 transmits a wake-up instruction to the display 73 at step S69.

Following the receipt of the wake-up instructions, the terminal device 100c enters the awake state at step S70.

At step S71, a normal touch operation is detected by the touch sensor 71. A non-limiting example of a normal touch operation occurs when a user touches an operation surface of the touch panel 7 with a finger or stylus. At step S72, the touch sensor 71 transmits to the touch sensor driver 72 the coordinate positions and electrostatic capacitance magnitude values corresponding to a distribution area of the touch operation detected at step S71.

At step S73, the touch sensor driver 72 transmits to the application Ap the received touch sensor coordinate positions and electrostatic capacitance values.

Following the receipt of the coordinate positions and electrostatic capacitance values at step S73, the application Ap at step S74 interfaces with the frame buffer 10 such that display update processing is performed, based on features of the detected touch operation. Similarly, the frame buffer 10 at step S75 interfaces with the display processor 9 such that the display update processing may be performed, and the display processor 9 interfaces with the display 73 at step S76 to perform the display update processing.

At step S77, the touch sensor 71 detects an operation in which the user's palm covers some or all of the display screen 73 of the touch panel 7. In certain embodiments, the determination that the user's palm is covering the display 73 may be based on features of the distribution area of the corresponding touch operation detected at step S77. For example, features related to the distribution area size and/or magnitude of electrostatic capacitance values within the distribution area may be compared to predetermined threshold values, and a determination as to whether the user's palm is covering the display 73 may be made based on the comparison. It should be appreciated that the operation detected at step S77 is not limited to detecting an entire palm, but rather a portion of the palm or another part of the hand may be detected (e.g., the touch sensor 71 may detect a plurality of fingers or another object of some arbitrary size). Moreover, the object/hand does not necessarily need to "cover" the entirety of the display 73 in order to generate a positive detection result.

When the determination is made at step S77 that the user's palm is covering the display 73, the touch sensor 71 at step S78 outputs a notification signal to the touch sensor driver 72 that the user's hand has been detected to be covering the display 73.

In response to receiving notification of the detection of the user's palm covering the display 73, the touch sensor 72 at step S79 transmits a similar notification of the detection of the user's palm to the palm detector 42.

In response to receiving the notification of the detection of the user's palm covering the display 73, the palm detector 42 at step S80 transmits a request to the controller 3 for a transition to the suspended state.

Upon receipt of the request to transition to the suspended state, the controller 3 at step S81 starts processing related to the start of the suspension state of the terminal device 100c. In particular, at step S82, the controller 3 transmits an instruction to the touch sensor driver 72 to start processing related to the suspended state. Upon receipt of the instruction to enter the suspended state at step S82, the touch sensor driver 72 at step S83 transmits an instruction to the touch sensor 71 to enter the suspended state. At step S84, the controller 3 transmits an instruction to enter the suspended state to the display processor 9. Upon receipt of the instruction to enter the suspended state at step S84, the display processor 9 at step S85 transmits an instruction to enter the suspended state to the display 73. Upon receipt of the instruction to enter the suspended state at steps S83 and step S85, the touch sensor 71 and the display 73, respectively, enter the condition corresponding to their suspended states. For example, the touch sensor 71 may discontinue scanning operations at the intermittent scan rate. Similarly, the display 73 may discontinue its output operations.

According to features of the exemplary processing described above with respect to FIGS. 16-19, a terminal device which has been woken up from its suspended state can be immediately transitioned back to the suspended state by the simple operation of covering the display screen 73 (i.e., the operation surface of the touch panel 7) using the user's hand. As mentioned previously, one of ordinary skill will appreciate that other objects aside from the user's hand may be detected by the touch sensor 71 such that similar processing results as those discussed above may be achieved. Moreover, the preceding example discusses a case in which the user's "palm" is utilized in the detection operation. However, the present disclosure is not limited to detecting the user's palm, and the present disclosure may be adapted such that the detection of other parts of the user's hand and/or other objects may initiate the processing related to returning the terminal device to the suspended state. In any case, according to the exemplary processing illustrated and described with respect to FIG. 19, the user may implement control processing for controlling a suspended state of a terminal device based on features of a distribution area corresponding to a touch operation detected by the touch panel 7 rather than a manipulation of external buttons such as the buttons included in the operation keys 8. Therefore, the ease at which the terminal device may be transitioned to and from the suspended state may be improved.

Moreover, the present disclosure is not limited to the case in which control processing related to the suspended state of a terminal device is performed based on a detection that a user's hand is in direct contact with the operation surface of the touch panel 7. For example, the touch sensor 71 may detect the presence of a user's hand hovering within a predetermined distance of the operation surface of the touch panel 7 (a "hovering operation"). As a non-limiting example, FIGS. 20A-20C illustrate a case in which the terminal device 100c is transitioned to the suspended state based on a detected hovering operation. FIG. 20A illustrates the terminal device 100c in an awake state whereby a home screen interface is displayed on the display 73. FIG. 20B illustrates an example in which a user holds his or her hand within a predetermined distance hovering over the operation surface of the touch panel 7. As discussed previously, electrostatic capacitance values may be detected in a case in which the user's hand or other conductive object is within a detection range of the touch sensor 71. Therefore, in response to detecting that the user's hand is hovering over the operation surface of the touch panel 7 as in the example of FIG. 20B, the controller 3 may control the terminal device 100c such that in response to detecting the hovering operation, the terminal device 100c transitions from the awake state of FIG. 20A to the suspended state illustrated in FIG. 20C.

Figure 21A:
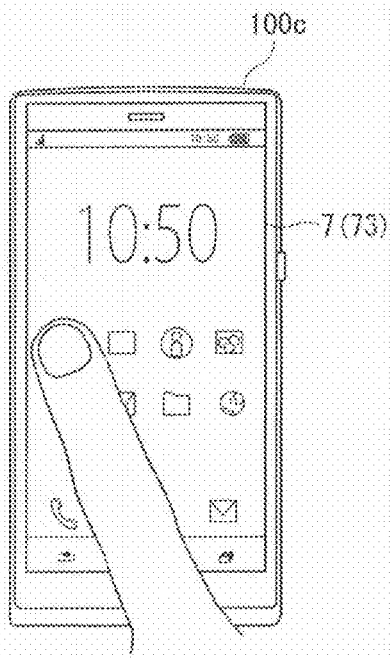
FIGS. 21A and 21B illustrate a non-limiting example of a touch sensor output distribution area generated based on a detected touch operation, according to certain embodiments.
Figure 21B:
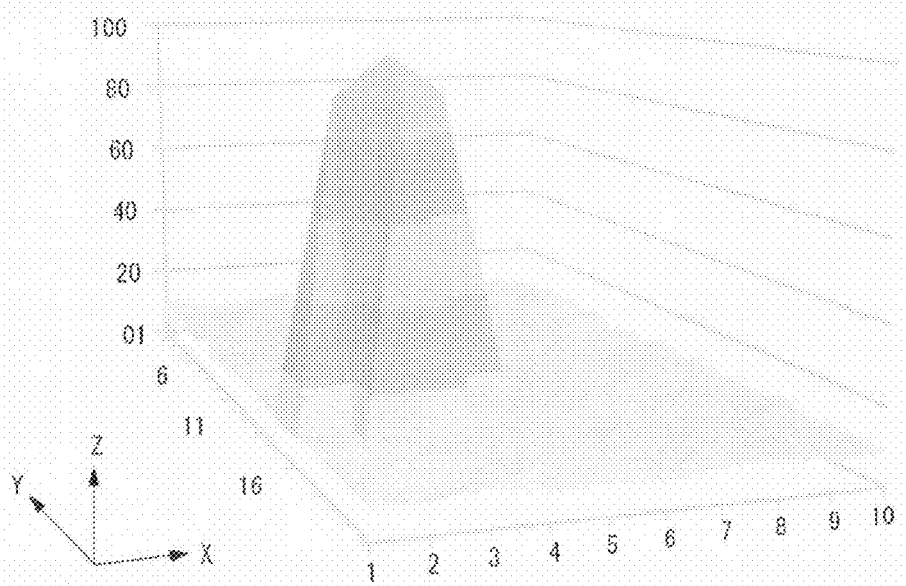

Next, FIGS. 21A and 21B illustrate a non-limiting example of a touch sensor output distribution area generated based on a detected touch operation, according to certain embodiments.

Referring first to FIG. 21A, FIG. 21A illustrates the terminal device 100c in the awake state. In this example, a home screen interface is shown displayed on the display 73, and a user's finger is illustrated contacting an icon included in the home screen interface.

Referring now to FIG. 21B, FIG. 21B illustrates a non-limiting example of a touch sensor output distribution area generated based on the detected touch operation of FIG. 21A. The touch sensor output distribution area illustrated in FIG. 21B includes electrostatic capacitance magnitude values and their associated coordinate positions resultant from the detected touch operation of FIG. 21A. The x-axis of FIG. 21B corresponds to the transversal direction (x direction) of the terminal device 100c shown in FIG. 21A; the y-axis of FIG. 21B corresponds to the longitudinal direction (y direction) of the terminal device 100c shown in FIG. 21A; and the z-axis of FIG. 21B shows the magnitude of electrostatic capacitance values detected by the touch sensor 71 during the touch operation illustrated in FIG. 21A. As illustrated in FIG. 21B, in response to detecting the touch operation of FIG. 21A, electrostatic capacitance values of relatively high magnitude (around 80) are concentrated around a coordinate position corresponding to the location on the operation surface of the touch panel 7 at which the touch operation was performed. Therefore, based on an analysis of the distribution area features of FIG. 21B, the controller 3 may determine that a touch operation centered, e.g., at the highest magnitude value in FIG. 21B has been performed using a single finger.

Figure 22A:
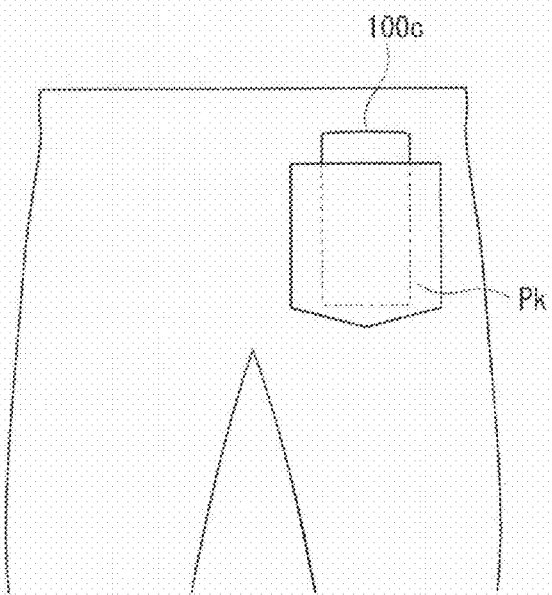
FIGS. 22A and 22B illustrate a non-limiting example in which a touch sensor output distribution area is generated in response to detecting a hover operation or detecting that the terminal device is stored in a user's pocket, according to certain embodiments.
Figure 22B:
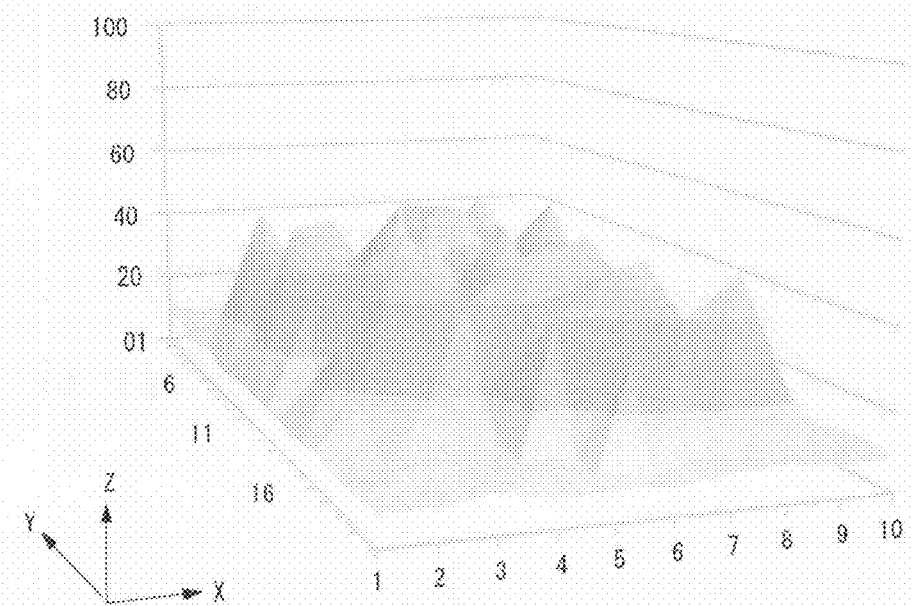

Next, FIGS. 22A and 22B illustrate a non-limiting example in which a touch sensor output distribution area is generated in response to detecting a hover operation or detecting that the terminal device is stored in a user's pocket, according to certain embodiments.

Referring first to FIG. 22A, FIG. 22A illustrates the terminal device 100c stored in the user's pocket Pk. It is assumed that the operating surface of the touch panel 7 in the example of FIG. 22A is facing the user when the terminal device 100c is stored in the pocket Pk. Therefore, when the terminal device 100c is stored in the pocket Pk, the user's clothing is separating the user's body from directly contacting the operating surface of the touch panel 7. However, because the user's body is still in close proximity to the operating surface of the touch panel 7, the touch sensor 71 may detect electrostatic capacitance values based on the presence of the user's body relative to the touch sensor 71. Because the user's body does not directly contact the operating surface of the touch panel 7 in this example, the electrostatic capacitance magnitude values generated by the touch sensor 71 in this example may be lower than the example of FIG. 21A. However, distinguishing features of distribution areas generated in response to detecting a hover operation or detecting when the terminal device is stored in a user's pocket may be utilized by the controller 3 to determine when these operations actually occur.

Referring now to FIG. 22B, FIG. 22B illustrates an exemplary touch sensor input distribution pattern generated as a result of the user storing the terminal device 100c in his or her pocket as in FIG. 22A. As shown in the example of FIG. 22B, electrostatic capacitance values may be detected by the touch sensor 71 across a wide area of coordinate positions, and the magnitude of the electrostatic capacitance values detected across the wider area may be relatively lower to the example in which the user directly contacts the operation surface of the touch panel 7 with his or her finger. That is, rather than the relatively high electrostatic capacitance magnitude values detected in the example of FIGS. 21A and 21B, where the user is directly contacting the operation surface of the touch panel 7 with his or her finger, a condition in which the user has placed the terminal device 100c in his or her pocket and/or is performing a hovering operation by holding his or her hand within a predetermined distance of the operating surface of the touch panel 7 results in a generated touch sensor output distribution area having relatively lower electrostatic capacitance magnitude values (approximately 20 to 40) spread across a wider area. Therefore, based on the relative differences between the distribution areas in the case in which the user directly contacts the operation surface of the touch panel 7 (e.g., FIG. 21A) and the case in which the user is not directly contacting the operating surface of the touch panel 7 (e.g., FIG. 22A), the controller 3 may determine when a hovering operation occurs and/or a condition in which the terminal device 100c is stored in the user's pocket exists.

Furthermore, based on features related to the size of the distribution area, the controller 3 may also distinguish between a condition in which the user directly contacts the operation surface of the touch panel 7 with one or more fingers or a case in which the user is covering the operating surface of the touch panel 7 with his or her palm (or another object). For example, the distribution area illustrated in the example of FIG. 22B shows electrostatic capacitance values dispersed across a wide area relative to the concentrated distribution of electrostatic capacitance values illustrated in the example of FIG. 21B. Therefore, in certain embodiments, the controller 3 may analyze distribution area size as a distinguishing feature for determining types of touch operations.

Referring still to FIG. 22B, the controller 3 may determine, based on the features of the distribution area illustrated in FIG. 22B, that a user is performing a hovering operation or that the user has stored the terminal device 100c in his or her pocket. Therefore, in a case in which, for example, an inadvertent touch operation is detected and thereby causes the terminal device 100c to be released from the suspended state, the detection of the distribution area of FIG. 22B by the touch sensor 71 may, in certain embodiments, result in the controller 3 controlling elements of the terminal device 100c such that the terminal device 100c returns to the suspended state.

Figure 23:
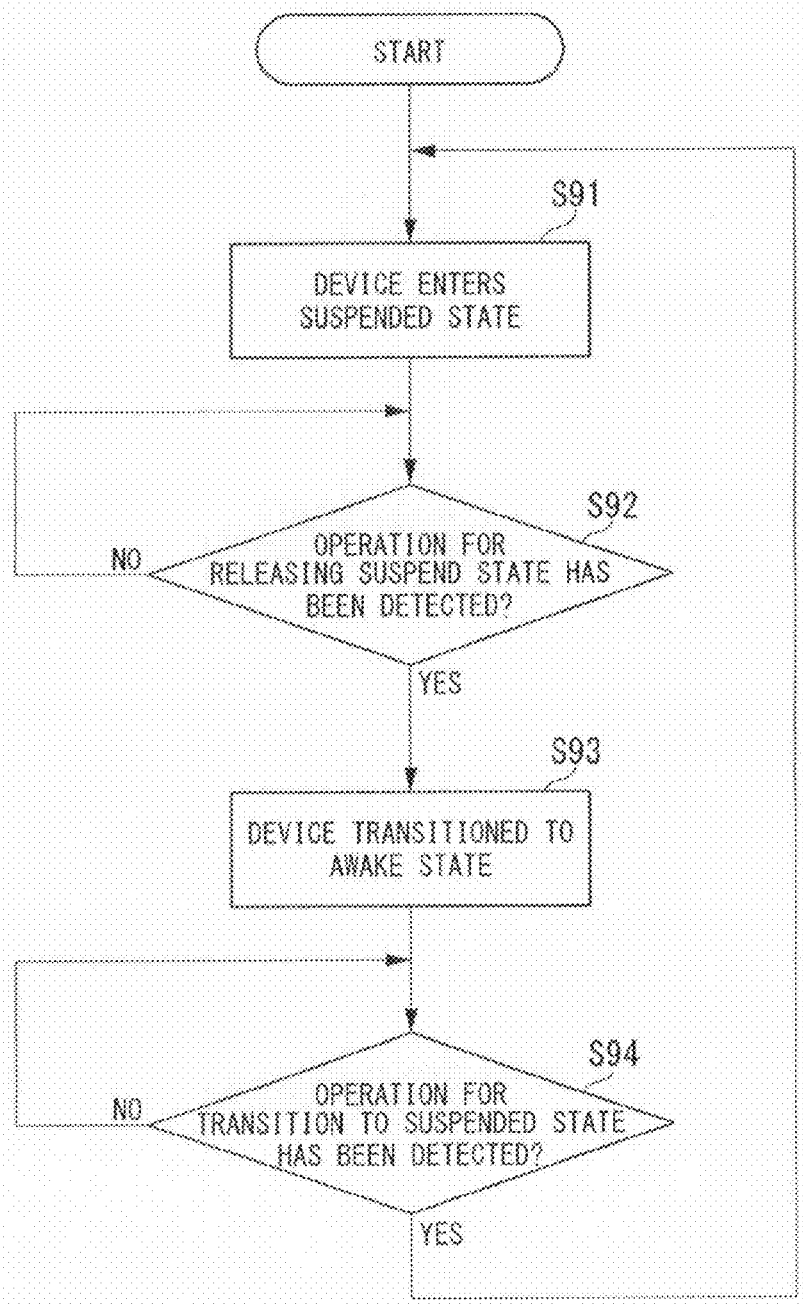
FIG. 23 illustrates a non-limiting exemplary flowchart for controlling a transition between a suspended state and an awake state of a terminal device, according to certain embodiments.

Next, FIG. 23 illustrates a non-limiting exemplary flowchart for controlling a transition between a suspended state and an awake state of a terminal device, according to certain embodiments.

At step S91, the controller 3 controls the terminal device such that the terminal device transitions to the suspended state based on a received input and/or operating condition corresponding to the transition to the suspended state. For example, the controller 3 may detect that an operation of the power key 81 has been performed and perform processing related to the transition to the suspended state based on the detection of the power key 81 operation. As another non-limiting example, the controller 3 may determine that a non-operation state of the touch panel 7 exists in which the user has not performed a touch operation on the touch panel for a predetermined time period, in which case the controller 3 may perform processing for transitioning the terminal device to the suspended state following the detected non-operation state for the predetermined time period.

At step S92, the controller 3 performs a determination as to whether an operation for releasing the suspended state has been detected. If the controller 3 does not detect that an operation for releasing the suspended state has been performed at step S92, the controller 3 continues monitoring for the operation of the suspended state release input. Otherwise, the controller 3 performs processing at step S93 such that the terminal device is transitioned to the awake state. Following the transition to the awake state at step S93, the controller 3 at step S94 determines whether an operation for transitioning to the suspended state has been detected. If the controller 3 at step S94 determines that an operation for transitioning back to the suspended state has been detected, the processing returns to step S91. Otherwise, the controller 3 continues monitoring for the operation corresponding to the transition back to the suspended state at step S94.

As shown in the example of FIG. 22A, when the terminal device 100c is inserted in the pocket Pk of the user's clothes in a state in which the operating surface of the touch panel 7 is facing the user's body. Referring to that example, step S92 of the exemplary flowchart of FIG. 23 may be determined as "YES" because the touch sensor 71 detects the presence of the user's body while the terminal device 100c is stored in the pocket Pk. However, in the state illustrated in FIG. 22A, since the electrostatic capacitance distribution area shown in FIG. 22B is detected similarly to a case in which a palm hovers over the operating surface of the touch panel 7, the controller 3 may determine that an operation for transitioning the terminal device 100c back to the suspended state has been performed. Therefore, according to this example, step S94 of FIG. 23 may be determined to be "YES," and the processing then returns to step S91. That is, although the terminal device 100c was transitioned to the awake state based on an inadvertently detected touch operation (i.e., the detection of the user's body when initially stored in the pocket Pk), processing features of the present example may ensure that the terminal device 100c is transitioned back to the suspended state based on features of a detected electrostatic capacitance distribution area.

Next, FIG. 24 illustrates a non-limiting example of a sequence diagram for performing processing related to the control of a suspended state based on detected features of a touch sensor output distribution area, according to certain embodiments.

Referring to FIG. 24, the sequence diagram begins at step S101 where the terminal device 100c is in the suspended state. At step S102, the touch sensor 71 detects an operation for releasing the suspended state of the terminal device 100c. In response to detecting the operation for releasing the suspended state, the touch sensor 71 at step S103 transmits to the touch sensor driver 72 a request for interruption of the suspended state (a wake-up signal). In response to receiving the request signal at step S103, the touch sensor driver 72 at step S104 transmits a request for device wake-up to the controller 3.

At step S105, in response to receiving the request for device wake-up at step S104, the controller 3 initializes processing for resuming normal operations of the terminal device and releasing the terminal device 100c from the suspended state (i.e., transitioning to the awake state). In particular, the controller 3 at step S106 outputs an instruction to wake up to the touch sensor driver 72. In response to receiving the instruction at step S106, the touch sensor driver 72 outputs at step S107 an instruction to wake up to the touch sensor 71. The touch sensor 71 and the touch sensor driver 72 may then be in the awake state in response to receiving the instructions from the controller 3 (step S108).

At step S109, while in the awake state, the touch sensor 71 detects a hovering operation performed by the user holding his or her palm within a predetermined distance of an operating surface of the touch panel 7. In response to detecting the hovering operation at step S109, the touch sensor 71 at step S110 outputs to the touch sensor driver 72 a notification of the hovering operation detection. In response to receiving the notification at step S110, the touch sensor driver 72 at step S111 outputs a notification of the hovering operation detection to the palm detector 42. In response to receiving the notification at step S111, the palm detector 42 outputs at step S112 a request to transition to the suspended state to the controller 3.

In response to receiving the request to transition to the suspended state at step S112, the controller 3 at step S113 starts processing for transitioning the terminal device 100c to the suspended state. In particular, the controller 3 at step S114 outputs an instruction to the touch sensor driver 72 to transition to the suspended state, and the controller 3 at step S116 outputs a similar instruction to transition to the suspended state to display processor 9. In response to receiving the instruction to transition to the suspended state, the touch sensor driver 72 and the display processor 9 at steps S115 and S117, respectively, output an instruction to enter the suspended state to the touch sensor 71 and the display 73. When the instructions to enter the suspended state are received by the touch sensor 71 and the display 73, the terminal device 100c has transitioned to the suspended state, which is illustrated at step S118.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising: a proximity sensor configured to detect when an object is within a predetermined proximity range of the device; input detection circuitry configured to detect when an input operation is performed on the device; and control circuitry configured to determine a proximity detection state of the device, wherein an object detection state corresponds to a proximity state in which the proximity sensor detects the object within the predetermined proximity range, and an object non-detection state corresponds to a proximity state in which the object is not detected within the predetermined proximity range, control a suspended state of the device, wherein the suspended state is a state of reduced processing and/or power consumption relative to a normal operating state, and control the input detection circuitry such that, when the device is in the suspended state and in the object detection state, the input detection circuitry stops processing related to the detection of the input operation.

(2) The device according to (1), wherein the control circuitry is configured to: determine when the input operation detected by the input detection circuitry corresponds to a wake-up signal for releasing the device from the suspended state; and control the suspended state of the device such that the device is released from the suspended when the wake-up signal is received.

(3) The device according to (1) or (2), wherein the input detection circuitry includes a touch panel display having one or more touch sensors configured to detect, as the input operation, a touch operation on an operating surface of the touch panel display.

(4) The device according to any one of (1) to (3), wherein: the wake-up signal is detected as the touch operation, and when the device is in the suspended state and in the object detection state, the control circuitry controls the input detection circuitry such that the wake-up signal is prevented from being detected by the input detection circuitry.

(5) The device according to any one of (1) to (4), wherein the control circuitry is configured to: generate, when the device is in the suspended state and the control circuitry detects a transition from the object detection state to the object non-detection state, a wake-up signal for releasing the device from the suspended state; and control the suspended state of the device such that the device is released from the suspended state following the generation of the wake-up signal.

(6) The device according to any one of (1) to (5), wherein the control circuitry is configured to control the suspended state of the device such that the device returns to the suspended state if the input detection circuitry does not detect the input operation within a predetermined time period following the wake-up signal generation.

(7) The device according to any one of (1) to (6), wherein: the input detection circuitry includes a touch panel display having one or more touch sensors configured to detect, as the input operation, a touch operation on an operating surface of the touch panel display; the input detection circuitry is configured to generate, in response to detecting the touch operation, a sensor output distribution area representing detected sensor output magnitudes and corresponding coordinate positions; and the control circuitry is configured to control the suspended state of the device such that the device returns to the suspended state based on a comparison of the sensor output distribution area data to predetermined threshold values.

(8) The device according to any one of (1) to (7), wherein the input detection circuitry is configured to detect, as the input operation, an audio input, the wake-up signal is detected as the audio input, and when the device is in the suspended state and in the object detection state, the control circuitry controls the input detection circuitry such that the wake-up signal is prevented from being detected by the input detection circuitry.

(9) The device according to any one of (1) to (8), wherein the proximity sensor is configured to perform scanning for detecting the object at a lower scan rate when the device is in the suspended state than when the device is in an awake state.

(10) The device according to any one of (1) to (9), wherein: the proximity sensor is configured to detect the object at a lower proximity range when the device is in the suspended state than when the device is in an awake state.

(11) A method of controlling a suspended state of a device, the method comprising: detecting, by a proximity sensor, when an object is within a predetermined proximity range of the device; detecting, by input detection circuitry, when an input operation is performed on the device; determining, by control circuitry, a proximity detection state of the device, wherein an object detection state corresponds to a proximity state in which the proximity sensor detects the object within the predetermined proximity range, and an object non-detection state corresponds to a proximity state in which the object is not detected within the predetermined proximity range; controlling, by the control circuitry, a suspended state of the device, wherein the suspended state is a state of reduced processing and/or power consumption relative to a normal operating state; and controlling, by the control circuitry, the input detection circuitry such that, when the device is in the suspended state and in the object detection state, the input detection circuitry stops processing related to the detection of the input operation.

(12) The method according to (11), further comprising: determining, by the control circuitry, when the input operation detected by the input detection circuitry corresponds to a wake-up signal for releasing the device from the suspended state; and controlling, by the control circuitry, the suspended state of the device such that the device is released from the suspended when the wake-up signal is received.

(13) The method according to (11) or (12), wherein the input detection circuitry includes a touch panel display having one or more touch sensors configured to detect, as the input operation, a touch operation on an operating surface of the touch panel display.

(14) The method according to any one of (11) to (13), wherein the wake-up signal is detected as the touch operation; and the method further comprises controlling, by the control circuitry, the input detection circuitry such that the wake-up signal is prevented from being detected by the input detection circuitry when the device is in the suspended state and in the object detection state.

(15) The method according to any one of (11) to (14), further comprising: generating, by the control circuitry, a wake-up signal for releasing the device from the suspended state when the device is in the suspended state and the control circuitry detects a transition from the object detection state to the object non-detection state; and controlling, by the control circuitry, the suspended state of the device such that the device is released from the suspended state following the generation of the wake-up signal.

(16) The method according to any one of (11) to (15), further comprising controlling, by the control circuitry, the suspended state of the device such that the device returns to the suspended state if the input detection circuitry does not detect the input operation within a predetermined time period following the wake-up signal generation.

(17) The method according to any one of (11) to (16), wherein: the input detection circuitry includes a touch panel display having one or more touch sensors configured to detect, as the input operation, a touch operation on an operating surface of the touch panel display; and the method further comprises generating, by the input detection circuitry, in response to detecting the touch operation, a sensor output distribution area representing detected sensor output magnitudes and corresponding coordinate positions; and controlling, by the control circuitry, the suspended state of the device such that the device returns to the suspended state based on a comparison of the sensor output distribution area data to predetermined threshold values.

(18) The method according to any one of (11) to (17), further comprising: detecting, by the input detection circuitry, as the wake-up signal, an audio input; and controlling, by the control circuitry, the input detection circuitry such that the wake-up signal is prevented from being detected by the input detection circuitry when the device is in the suspended state and in the object detection state.

(19) The method according to any one of (11) to (18), further comprising controlling, by the control circuitry, a scan rate of the proximity sensor such that the proximity sensor performs scanning for detecting the object at a lower scan rate when the device is in the suspended state than when the device is in an awake state.

(20) A non-transitory computer readable medium having instructions stored therein that, when executed by one or more processors, cause the one or more processors to perform a method of controlling a suspended state of a device, wherein the device includes a proximity sensor, the method comprising: detecting when an object is within a predetermined proximity range of the device; detecting when an input operation is performed on the device; determining a proximity detection state of the device, wherein an object detection state corresponds to a proximity state in which the proximity sensor detects the object within the predetermined proximity range, and an object non-detection state corresponds to a proximity state in which the object is not detected within the predetermined proximity range; controlling a suspended state of the device, wherein the suspended state is a state of reduced processing and/or power consumption relative to a normal operating state; and controlling input detection processing of the device such that, when the device is in the suspended state and in the object detection state, the processing related to the detection of the input operation is stopped.

The invention claimed is:

1. A device comprising:
a proximity sensor configured to detect when an object is within a predetermined proximity range of the device; and
circuitry configured to
detect when an input operation is performed on the device;
determine a proximity detection state of the device, wherein an object detection state corresponds to a proximity state in which the proximity sensor detects the object within the predetermined proximity range, and an object non-detection state corresponds to a proximity state in which the object is not detected within the predetermined proximity range,
control a suspended state of the device, wherein the suspended state is a state of reduced processing and/or power consumption relative to a normal operating state, and
when the device is in the suspended state and in the object detection state, stop processing related to the detection of the input operation, continue processing related to the proximity detection state, and control the proximity sensor to detect the object at a lower proximity range when the device is in the suspended state than when the device is in the normal operating state.

2. The device according to claim 1, wherein
the circuitry is configured to:
determine when the input operation corresponds to a wake-up signal for releasing the device from the suspended state; and
control the suspended state of the device such that the device is released from the suspended state when the wake-up signal is received.

3. The device according to claim 2, wherein
the circuitry includes a touch panel display having one or more touch sensors configured to detect, as the input operation, a touch operation on an operating surface of the touch panel display.

4. The device according to claim 3, wherein:
the wake-up signal is detected as the touch operation, and
when the device is in the suspended state and in the object detection state, the circuitry is configured to control the input detection operation such that the wake-up signal is prevented from being detected.

5. The device according to claim 2, wherein:
the circuitry is configured to detect, as the input operation, an audio input,
the wake-up signal is detected as the audio input, and
when the device is in the suspended state and in the object detection state, the circuitry is configured to control the input detection operation such that the wake-up signal is prevented from being detected.

6. The device according to claim 1, wherein the circuitry is configured to:
generate, when the device is in the suspended state and the circuitry detects a transition from the object detection state to the object non-detection state, a wake-up signal for releasing the device from the suspended state; and
control the suspended state of the device such that the device is released from the suspended state following the generation of the wake-up signal.

7. The device according to claim 6, wherein the circuitry is configured to control the suspended state of the device such that the device returns to the suspended state if the circuitry does not detect the input operation within a predetermined time period following the wake-up signal generation.

8. The device according to claim 6, wherein:
the circuitry includes a touch panel display having one or more touch sensors configured to detect, as the input operation, a touch operation on an operating surface of the touch panel display;
the circuitry is configured to generate, in response to detecting the touch operation, a sensor output distribution area representing detected sensor output magnitudes and corresponding coordinate positions; and
the circuitry is configured to control the suspended state of the device such that the device returns to the suspended state based on a comparison of the sensor output distribution area data to predetermined threshold values.

9. The device according to claim 1, wherein the proximity sensor is configured to perform scanning for detecting the object at a lower scan rate when the device is in the suspended state than when the device is in the normal operating state.

10. A method of controlling a suspended state of a device, the method comprising:
detecting, by a proximity sensor, when an object is within a predetermined proximity range of the device;
detecting, by circuitry, when an input operation is performed on the device;
determining, by the circuitry, a proximity detection state of the device, wherein an object detection state corresponds to a proximity state in which the proximity sensor detects the object within the predetermined proximity range, and an object non-detection state corresponds to a proximity state in which the object is not detected within the predetermined proximity range;
controlling, by the circuitry, a suspended state of the device, wherein the suspended state is a state of reduced processing and/or power consumption relative to a normal operating state; and
controlling, by the circuitry, the input detection operation such that, when the device is in the suspended state and in the object detection state, the circuitry stops processing related to the detection of the input operation, continues processing related to the proximity detection state, and controls the proximity sensor to detect the object at a lower proximity range when the device is in the suspended state than when the device is in the normal operating state.

11. The method according to claim 10, further comprising:
determining, by the circuitry, when the input operation corresponds to a wake-up signal for releasing the device from the suspended state; and
controlling, by the circuitry, the suspended state of the device such that the device is released from the suspended state when the wake-up signal is received.

12. The method according to claim 11, wherein the circuitry includes a touch panel display having one or more touch sensors configured to detect, as the input operation, a touch operation on an operating surface of the touch panel display.

13. The method according to claim 12, wherein the wake-up signal is detected as the touch operation; and the method further comprises
controlling, by the circuitry, the input detection operation such that the wake-up signal is prevented from being detected when the device is in the suspended state and in the object detection state.

14. The method according to claim 11, further comprising:
detecting, by the circuitry, as the wake-up signal, an audio input; and
controlling, by the circuitry, the input detection operation such that the wake-up signal is prevented from being detected when the device is in the suspended state and in the object detection state.

15. The method according to claim 10, further comprising:
generating, by the circuitry a wake-up signal for releasing the device from the suspended state when the device is in the suspended state and the circuitry detects a transition from the object detection state to the object non-detection state; and
controlling, by the circuitry, the suspended state of the device such that the device is released from the suspended state following the generation of the wake-up signal.

16. The method according to claim 15, further comprising
controlling, by the circuitry, the suspended state of the device such that the device returns to the suspended state if the circuitry does not detect the input operation within a predetermined time period following the wake-up signal generation.

17. The method according to claim 15, wherein:
the circuitry includes a touch panel display having one or more touch sensors configured to detect, as the input operation, a touch operation on an operating surface of the touch panel display; and
the method further comprises
generating, by the circuitry, in response to detecting the touch operation, a sensor output distribution area representing detected sensor output magnitudes and corresponding coordinate positions; and
controlling, by the circuitry, the suspended state of the device such that the device returns to the suspended state based on a comparison of the sensor output distribution area data to predetermined threshold values.

18. The method according to claim 10, further comprising
controlling, by the circuitry, a scan rate of the proximity sensor such that the proximity sensor performs scanning for detecting the object at a lower scan rate when the device is in the suspended state than when the device is in the normal operating state.

19. A non-transitory computer readable medium having instructions stored therein that, when executed by one or more processors, cause the one or more processors to perform a method of controlling a suspended state of a device, wherein the device includes a proximity sensor, the method comprising:

detecting when an object is within a predetermined proximity range of the device;

detecting when an input operation is performed on the device;

determining a proximity detection state of the device, wherein an object detection state corresponds to a proximity state in which the proximity sensor detects the object within the predetermined proximity range, and an object non-detection state corresponds to a proximity state in which the object is not detected within the predetermined proximity range;

controlling a suspended state of the device, wherein the suspended state is a state of reduced processing and/or power consumption relative to a normal operating state; and controlling input detection processing of the device such that, when the device is in the suspended state and in the object detection state, the processing related to the detection of the input operation is stopped, the processing related to the proximity detection state is continued, and the proximity sensor is controlled to detect the object at a lower proximity range when the device is in the suspended state than when the device is in the normal operating state.

* * * * *